United States Patent [19]
Karim

[11] Patent Number: 5,481,683
[45] Date of Patent: Jan. 2, 1996

[54] SUPER SCALAR COMPUTER ARCHITECTURE USING REMAND AND RECYCLED GENERAL PURPOSE REGISTER TO MANAGE OUT-OF-ORDER EXECUTION OF INSTRUCTIONS

[75] Inventor: Faraydon Karim, Round Rock, Tex.

[73] Assignee: International Business Machines Corporation, Armonk, N.Y.

[21] Appl. No.: 34,193

[22] Filed: Mar. 19, 1993

Related U.S. Application Data

[63] Continuation-in-part of Ser. No. 969,695, Oct. 30, 1992, abandoned.

[51] Int. Cl.$^6$ .............................. G06F 9/30; G06F 9/00
[52] U.S. Cl. ................. 395/375; 395/800; 364/262.4; 364/DIG. 1
[58] Field of Search .................................. 395/375, 800

[56] References Cited

U.S. PATENT DOCUMENTS

| | | | |
|---|---|---|---|
| 3,346,851 | 10/1967 | Thornton et al. | 364/704 |
| 4,574,349 | 3/1986 | Rechtschaffen | 364/DIG. 1 |
| 4,807,115 | 2/1989 | Torng | 395/375 |
| 4,847,755 | 7/1989 | Morrison et al. | 395/650 |
| 4,901,233 | 2/1990 | Liptay | 364/DIG. 1 |
| 4,903,196 | 2/1990 | Pomerene et al. | 364/DIG. 1 |
| 4,972,470 | 11/1990 | Farago | 380/3 |
| 5,133,077 | 7/1992 | Karne et al. | 395/800 |

(List continued on next page.)

FOREIGN PATENT DOCUMENTS

| | | |
|---|---|---|
| 0301220A3 | 2/1989 | European Pat. Off. |
| 0432774A3 | 6/1991 | European Pat. Off. |

OTHER PUBLICATIONS

Weiss, "Third–Generation RISC Processors," EDN, v37, n7, pp. 96+, Mar. 1992.
*An Instruction Issuing Approach to Enhancing Performance in Multiple Functional Unit Processors,* 1986 IEEE Transactions on Computers, Sep., 1986, vol. C–35, No. 9, pp. 815–828, Acosta et al.
*The ZS–1 Central Processor,* 1987 Proceedings Second International Conference on Architectural Support for Programming Languages and Operating Systems (ASPLOS II), Oct. 5–8, 1987, Palo Alto, Calif., pp. 199–204, Smith et al.
"The Architecture of Pipelined Computers", P. M. Kogge, pp. 140–144, 232–236, 1981.
IBM Technical Disclosure Bulletin, vol. 34, No. 10A, Mar. 92, "Conditional Execution in a Register Management Scheme for out of Sequence Execution", pp. 449–454.
IBM Technical Disclosure Bulletin, vol. 32, No. 11, Apr. 1990, "Vector Register Allocation", pp. 282–284.
*The 12th Annual International Symposium on Computer Architecture,* "Implementation of Precise Interrupts in Pipelined Processors", Jun. 1985, Boston, U.S., pp. 36–44, Smith et al.

*Primary Examiner*—Thomas G. Black
*Assistant Examiner*—Paul Harrity
*Attorney, Agent, or Firm*—Casimer K. Salys

[57] ABSTRACT

A super scalar computer architecture and method of operation for executing instructions out-of-order while managing for data dependencies, data anti-dependencies, and integrity of sequentiality for precise interrupts, restarts and branch deletions. Multiple registers and tables are used to rename and recycle source and destination addresses referenced to a general purpose register. Access to destination data in the general purpose register is locked until the instruction associated with the data is fully executed. Renaming of both the source and destination registers avoids anti-dependency problems while integrity of sequentiality is maintained by ordered retirement of instruction results consistent with the order of the input instructions. The system and method operate with multiple input instructions and multiple execution units. The control words generated by the renaming of the source and destination registers differ insignificantly from the original instructions, obviating the practice of adding status and sequence information to processor control words.

17 Claims, 35 Drawing Sheets

U.S. PATENT DOCUMENTS

| | | | |
|---|---|---|---|
| 5,134,561 | 7/1992 | Liptay | 395/425 |
| 5,155,817 | 10/1992 | Kishigami et al. | 395/375 |
| 5,197,132 | 3/1993 | Steely, Jr. et al. | 395/375 |
| 5,261,071 | 11/1993 | Lyon | 395/425 |
| 5,280,615 | 1/1994 | Church et al. | 395/650 |
| 5,355,457 | 10/1994 | Shebanow et al. | 395/375 |
| 5,386,562 | 1/1995 | Jain et al. | 395/650 |

Instruction stream as in the memory

| | |
|---|---|
| a7 | R3 <- R2 + R1 |
| a6 | R0 <- R1 * R2 |
| a5 | R3 <- R2 * R0 |
| a4 | R0 <- R1 / R2 |
| a3 | R3 <- R2 * R0 |
| a2 | R0 <- R1 / R2 |
| a1 | Branch |
| a0 | R3 <- R1 + R2 |

Address Table In the Fetch unit

| 01 | 00 | 00 |
|---|---|---|
| 00 | a0 | 11 |

| 7/3 | 6/0 | 0 | 0 |
|---|---|---|---|

Rename 1

| 00 | 06 |
|---|---|
| 01 | 01 |
| 02 | 02 |
| 03 | 07 |

CVT 1

| 3 | 11 | | 0000 |
|---|---|---|---|
| 2 | 10 | | 0000 |
| 1 | 04 | | 0000 |
| 0 | 00 | | 0000 |

CVT 0

| 3 | 07 | 03 | 0000 |
|---|---|---|---|
| 2 | 06 | 00 | 0000 |
| 1 | 05 | | 0000 |
| 0 | 03 | 03 | 0000 |

CVT tables

Rename 2

| 00 | 06 |
|---|---|
| 01 | 01 |
| 02 | 02 |
| 03 | 07 |

Physical locations of GPRs   Lock bit

| 00 | 123 | 0 |
|---|---|---|
| 01 | 045 | 0 |
| 02 | 061 | 0 |
| 03 | 100 | 0 |
| 04 | 106 | 0 |
| 05 | | 0 |
| 06 | | 0 |
| 07 | | 0 |
| 08 | .74 | 0 |
| 09 | 45.14 | 0 |
| 10 | | 1 |
| 11 | 106 | 0 |

FIG. 28

Instruction stream as in the memory

| | |
|---|---|
| a7 | R3 <- R2 + R1 |
| a6 | R0 <- R1 * R2 |
| a5 | R3 <- R2 * R0 |
| a4 | R0 <- R1 / R2 |
| a3 | R3 <- R2 * R0 |
| a2 | R0 <- R1 / R2 |
| a1 | Branch |
| a0 | R3 <- R1 + R2 |

Address Table In the Fetch unit

| 01 | 00 | 00 |
|---|---|---|
| 00 | a0 | 01 |

Rename 1

| 0 | 0 | 0 | 0 |
|---|---|---|---|

| 00 | 08 |
|---|---|
| 01 | 01 |
| 02 | 02 |
| 03 | 03 |

CVT 1

| 3 | 11 | | 0000 |
|---|---|---|---|
| 2 | 10 | | 0000 |
| 1 | 04 | | 0000 |
| 0 | 00 | | 0000 |

CVT 0

| 3 | 07 | 03 | 0000 |
|---|---|---|---|
| 2 | 06 | 00 | 0000 |
| 1 | 05 | | 0000 |
| 0 | 03 | 03 | 0000 |

CVT tables

Rename 2

| 00 | 08 |
|---|---|
| 01 | 01 |
| 02 | 02 |
| 03 | 03 |

Physical locations of GPRs   Lock bit

| 00 | 123 | 0 |
|---|---|---|
| 01 | 045 | 0 |
| 02 | 061 | 0 |
| 03 | 100 | 0 |
| 04 | 106 | 0 |
| 05 | | 0 |
| 06 | | 0 |
| 07 | | 0 |
| 08 | .74 | 0 |
| 09 | 45.14 | 0 |
| 10 | | 1 |
| 11 | 106 | 0 |

FIG. 29

SUPER SCALAR COMPUTER ARCHITECTURE USING REMAND AND RECYCLED GENERAL PURPOSE REGISTER TO MANAGE OUT-OF-ORDER EXECUTION OF INSTRUCTIONS

This is a continuation-in-part of application Ser. No. 07/969,695 filed Oct. 30, 1992, now abandoned.

BACKGROUND OF THE INVENTION

The present invention relates generally to computer architectures. More particularly, the invention is directed to the architecture and use of registers within a super scalar computer.

The evolution of computer architectures has transitioned from the now broadly accepted reduced instruction set computing (RISC) configurations to super scalar computer architectures. Such super scalar computer architectures are characterized by the presence of multiple and concurrently operable execution units integrated through a plurality of registers and control mechanisms. The objective of the architecture is to employ parallelism to maximize the number of instructions concurrently processed by the multiple execution units during each interval of time, while ensuring that the order of instruction execution as defined by the programmer is reflected in the output. For example, the control mechanism must manage dependencies among the data being concurrently processed by the multiple execution units, the control mechanism must ensure that integrity of sequentiality is maintained in the presence of precise interrupts and restarts, and the control mechanism must provide instruction deletion capability such as is needed with instruction defined branching operations, yet retain the overall order of the program execution. The objectives are always sought mindful of the commercial objectives of minimizing electronic device count and complexity, where the prevailing convention in the context of the super scalar architecture is to reduce the size and content of the registers and the bit size of the words used for control and data transmission among the circuits.

A variety of architectures have been devised to manage the out-of-order execution of instructions. One example is the architecture and mode of operation described in U.S. Pat. No. 4,722,049, which architecture generally reorders instructions in a queue to optimize the use of a scalar/vector pair of execution units. A more relevant architecture and method of use is described in the article entitled "The Metaflow Architecture" authored by Popescu et al as appeared in the June, 1991 issue of *IEEE Micro*. This article provides an overview of contemporary super scalar architecture principles in the context of the problems characterizing out-of-order execution of instructions. The authors of the article also introduce the principles which underlie their implementation of an out-of-order instruction processor composed of multiple execution units, an architecture which utilizes a shelving concept to selectively defer instruction processing so as to meet the fundamental objective of having the instruction results reflect the order defined by the programmer. Two other techniques, commonly referred to as "scoreboarding" and the "Tomasulo algorithm" of dynamic scheduling are described in the textbook *Computer Architecture A Quantitative Approach* by Patterson et al, copyright 1990. A third technique, "register renaming", is disclosed and illustrated by example in U.S. Pat. No. 4,992,938. Thus, though the benefits of out-of-order instruction execution using multiple execution units are acknowledged, the architectures and methods for accomplishing the objectives have yet to be refined to an industry accepted.

Examples of fundamental constraints which limit super scalar architectures and practices include, the management of data dependencies among data being concurrently processed in multiple execution units, the ability to handle precise interrupts and restarts while maintaining the integrity of the instruction sequence, and the ability to selectively delete instructions for branching purposes or the like. Though such features are attainable, the complexity and hardware costs have heretofore been quite significant. For example, the deferral of instruction processing through the practice of shelving or reserving, as noted in the prior art, requires significant memory for instruction storage as well as resources for controlling the selective deshelving of instructions. Furthermore, the prior art use of information which relates shelved or reserved instructions both among themselves and to the control resources significantly increases the size of the control word subject both to storage and processing by the execution units. Therefore, there remains a need for a super scalar architecture in which multiple execution units concurrently process out-of-order instructions with minimum memory register and control resources.

SUMMARY OF THE INVENTION

The present invention defines a super scalar computer architecture suitable to execute multiple instructions concurrently and out-of-order. A plurality of independently operable execution units complete operations defined by control words. The source and destination information associated with the control words assigned to the various execution units is read and written to registers which are recycled by address manipulation responsive to the execution status of the control words. An ordered allocation of control word addresses avoids anti-dependency problems, ensures integrity of the sequentiality, and manages data dependencies consistent with the order of the input instructions.

According to a preferred implementations the invention contemplates an architecture composed of multiple execution units responsive to control words dispatched individually but in succession as execution units become available. Multiple control words are formed concurrently from multiple input instructions. Each control word includes collision vector table pointer information, instruction opcode information, destination address information, and plural source address information. The addresses of the registers used to store the data subject to execution are recycled upon execution of the control words as defined by the order of the input instructions. Data dependencies are managed through the use of lock-bits in the general purpose registers storing the destination data. Multiple rename registers are used in conjunction with one or more collision vector tables to minimize general purpose register count and to avoid anti-dependencies between successive instructions. Recycling of register addresses by the collision vector table includes resources for ensuring that the order of released register addresses coincides with the order of the input instructions. Thereby, the integrity of the sequentiality necessary for precise interrupts and branch related instruction deletions is accomplished within the framework of the architecture.

These and other features of the invention will become apparent upon considering the detailed description which follows.

BRIEF DESCRIPTION OF THE DRAWINGS

FIGS. 27, 28, and 29 schematically illustrate the register contents for an example involving a branch instruction, including the additional tag bits and registers used with branches.

DESCRIPTION OF THE PREFERRED EMBODIMENT

The benefits and limitations of super scalar architected computers and workstations are relatively well known. Consequently, the technical community has been pursuing architectures within that class which both satisfy the physical constraints and maximize the rate of processing data. Fundamental to a super scalar architecture is the presence of multiple execution units concurrently processing individual instructions in a program defined order of sequence. The input to such a super scalar architecture is a set of instructions of defined order, which order when satisfied leads to a set of outputs conforming to the objectives of the programmer. Thus, at a high-level the super scalar architecture is responsive to an ordered input and must generate an output constrained by elements within that order.

A super scalar processor creates a number of problems with out-of-order execution of instructions. One such problem is data dependency, where the output of one execution unit is defined by instruction to be the input to another execution unit. Another problem with super scalar architecture processors is often referred to as anti-dependency, whereby the execution units complete their respective instructions in an order different than the order the instructions were issued. A third class of problem encountered with super scalar architecture processors relates to the integrity of the sequentiality as affected by actions other than the instruction sequence. For example, processors must be able to handle precise interrupts, precise in that the order of the instructions output must not be altered as a consequence of an interrupt or a branch operation involving the deletion of one or more instructions. Therefore, a meaningful super scalar architecture must not only include a multiplicity of concurrently operable execution units, but must manage the processing of instructions to ensure that the order and content as defined by the programmer remain intact during all operating conditions of the processor.

Figure 1:
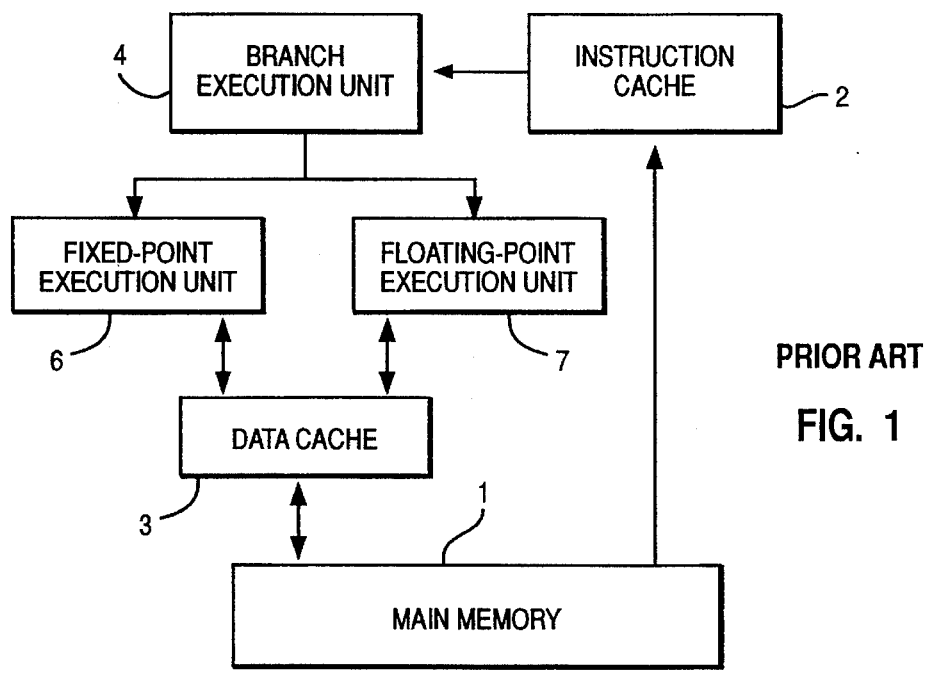
FIG. 1 is a high-level schematic block diagram of a prior art multiple execution unit architecture.

FIG. 1 illustrates an example of a processor architecture which implements super scalar concepts. The blocks illustrate the architecture employed in the RISC System/6000 workstation manufactured and commercially distributed by IBM Corporation. Main memory 1 has connected thereto both instruction cache 2 and data cache 3. Branch execution unit 4 not only resolves branching operations but passes fixed point and floating point instructions to respective concurrently operable execution units 6 and 7. Thus, the architecture depicted in FIG. 1 is super scalar to the extent of having separate execution units for floating point and fixed point instructions.

The extension of the super scalar concept in FIG. 1 to a generic set of multiple execution units, individually capable of fixed point, floating point, and branch operations, represents the path presently pursued by contemporary computer designers. One approach is described in the aforementioned *IEEE Micro* article by Popescu et al. The article describes a super scalar architecture identified as DRIS, an acronym derived from the functionally descriptive deferred scheduling register renaming instruction shelf. This architecture employs a deferral or shelving of instructions at both the input and output to manage data dependencies and anti-dependencies. The shelved or buffered instructions are thereafter managed both during the selective assignment to execution units and the scheduling for final retirement. The shelved deferral and retrieval of instructions involves the generation of extended control words to manage instruction status and sequencing, given the various dependent relationships possible and the fundamental requirement of instruction execution consistent with a programmer's objectives.

The present invention defines a super scalar computer system architecture in which the execution units, such as fixed point execution unit 6 and floating point execution unit 7 in FIG. 1, are suitably selected and operated to execute instructions concurrently. The synchronization of data signals to the execution units is performed through registers which are judiciously managed using a unique control word generator, multiple rename registers, a lockable general purpose register, and a collision vector table. The architecture is depicted by high level functional blocks in FIG. 2.

Figure 2:
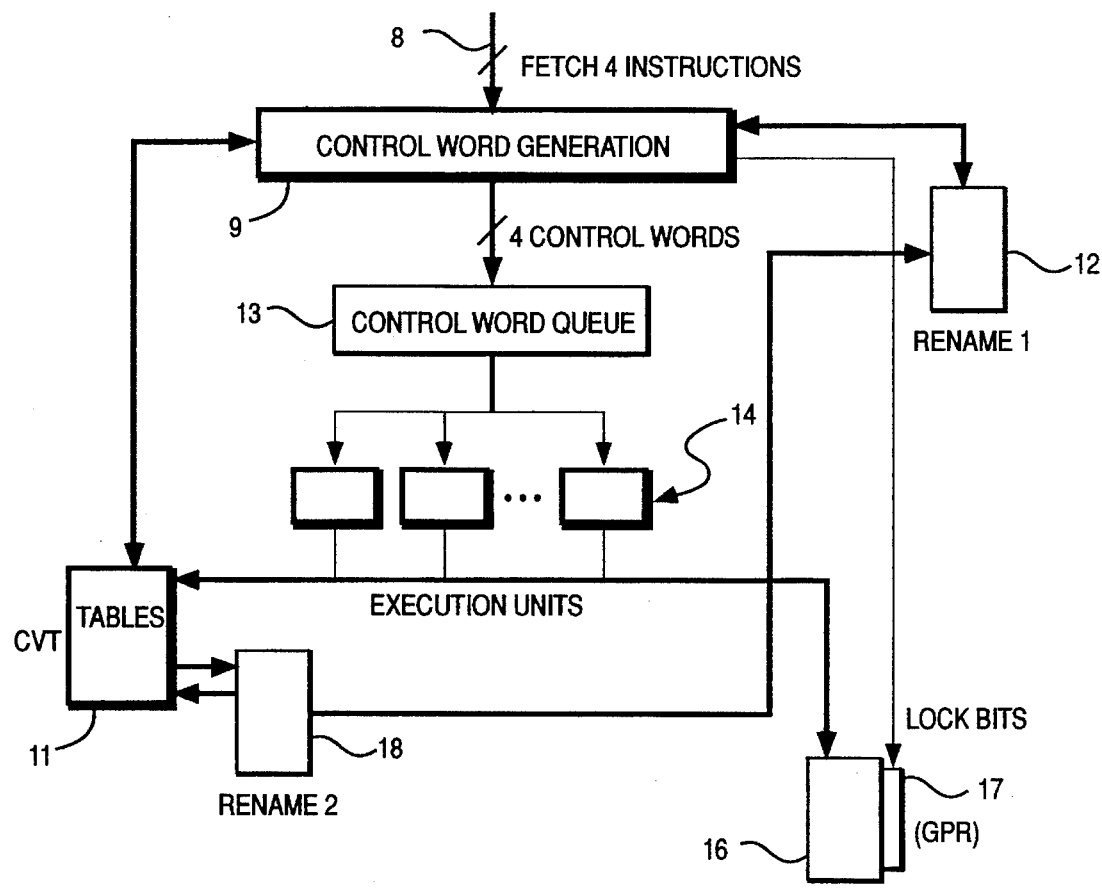
FIG. 2 is a schematic block diagram of a preferred implementation of the registers and execution units in the present architecture.

The super scalar architecture illustrated by the embodiment in FIG. 2 involves a computer in which multiple input instructions are received at one time and then processed individually by the next available of the multiplicity of execution units. Each execution unit has resources to handle all instruction classes. Such commonality of execution unit resources is more likely to exist in a graphics processor system than in a general purpose computer, given that a general purpose computer will usually have execution units individually specializing to fixed and floating point processing and will respectively assign control words thereto. The present invention applies equally to either class of processing system.

The embodiment depicted in FIG. 2 receives its input on instruction word input bus 8, a bus suitable to transmit four instructions simultaneously. The instructions are reconfigured in control word generator 9 using pointer address information from collision vector table 11, opcode information from the original instructions, and translated source and destination addresses from respective rename register 12 and collision vector table 11. The details of control word generation will be described with reference to FIG. 3, hereinafter. The four control words generated from the respective four instructions are then conveyed to control word queue 13 for assignment to the next available execution unit. Execution units 14 process the control words in succession as defined by the queue using data stored at defined source addresses in general purpose register 16. Lock bits 17, associated with general purpose register 16, control dependencies between source and destination data in a manner analogous to the prior art. The interaction between collision vector table 11 and rename register 18 facilitates the timely recycling of physical addresses attributed to general purpose register 16 and defines a structure and method of operation suitable to insure sequentiality of execution following interrupts as well as selective deletions following branch operations.

The first and second rename registers, 12 and 18, are each equal in count to the architected registers of the system. In the ensuing example this count is four. The number of general purpose registers in 16 is equal to the sum of the architected registers, namely the count usable by the programmer, together with the number of registers in collision vector table 11.

Figure 3:
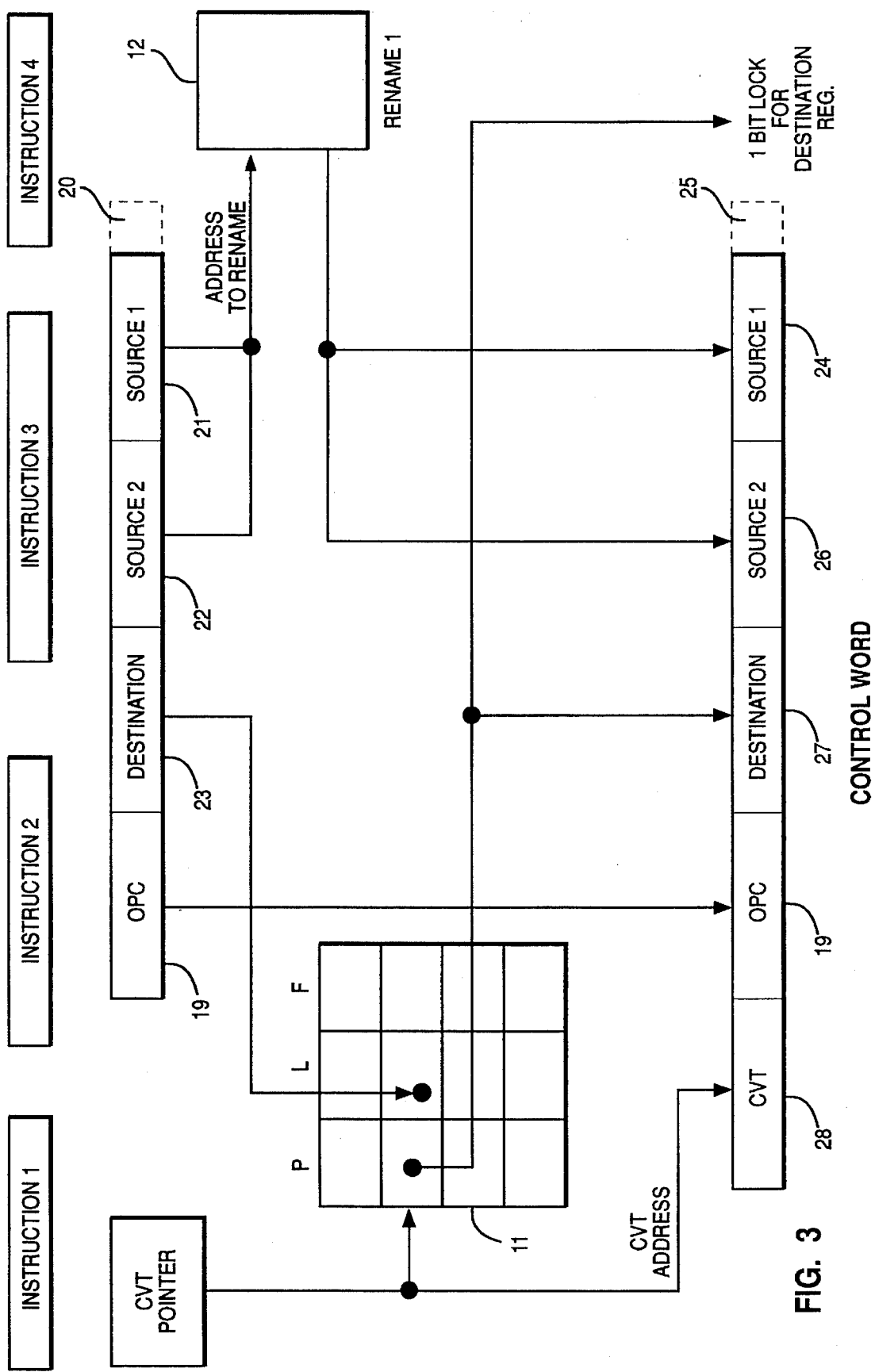
FIG. 3 is a functional schematic depicting the formation of control words.

FIG. 3 schematically depicts the creation of the control word, as is accomplished in control word generator 9 of FIG. 2. Each of the four instructions is composed of an opcode bit string 19, together with the program defined first source address 21, second source address 22, and destination address 23. The corresponding control word bit string as created in the control word generator includes a renamed first source address 24, a renamed second source address 26, a translated destination address 27, the corresponding opcode 19, and a collision vector table pointer address 28.

Note that additional instruction and control word sources, respectively 20 and 25, are possible when the computer uses extended instructions. Rename register 12 is used directly for reassigning register addresses 24 and 26. The CVT bit string portion of the control word is derived from the pointer address designating the next available row within collision vector table 11. Once selected the row contains a physical address entry "P", designating an available general purpose register 16 (FIG. 2), a logical address entry "L", corresponding to destination 23 as defined in the original instruction, and at least a finish status bit. The finish bit entry "F" is used to control a pointer which recycles general purpose register 16 addresses when associated control words have been executed. The lock bit associated with the destination physical address is in 17 for the corresponding physical address within general purpose register 16 (FIG. 2).

One should note that the control word both in structure and size is very similar to the original instruction, and as such obviates the need for additional bits to indicate status, location, relative position and the like information commonly attached to other super scalar instruction translations. While other super scalar architectures create large and complex control words to relayed instructions in the context of dependencies, anti-dependencies, and integrity of sequentiality requirements, the present invention accomplishes such objectives through the judicious assignment and recycling of registers.

Figure 4:
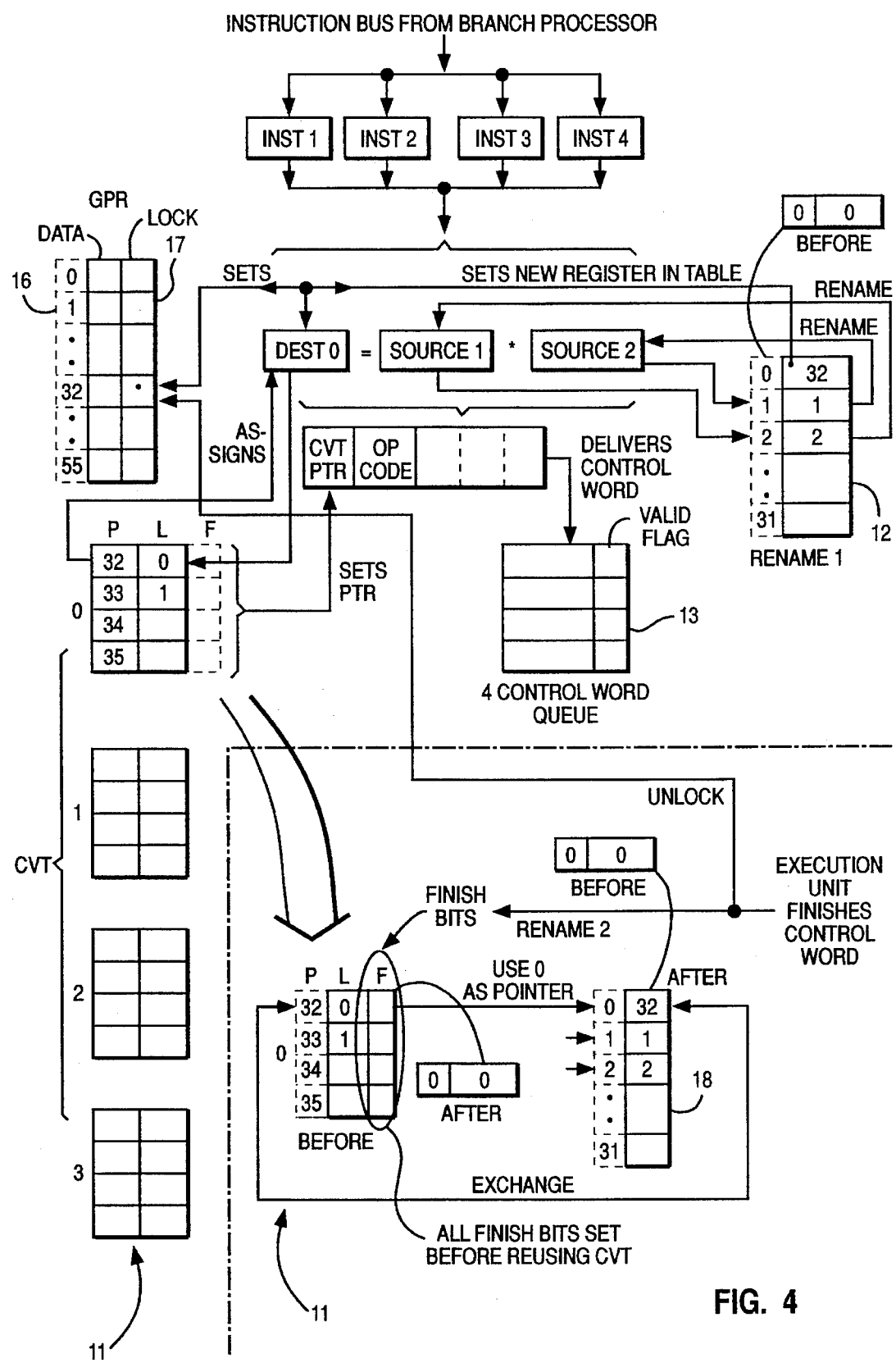
FIG. 4 is a functional schematic depicting the actions associated with register recycling according to the present invention.

FIG. 4 schematically illustrates the interaction among the tables and registers to appropriately assign addresses and to manage control word creation, distribution, and retirement. The general purpose register (GPR) 16 stores the data and has lock bits 17 associated therewith. Preferably, the collision vector table (CVT) 11 is composed of four sub-tables which individually have the same number of rows as simultaneously input instructions. Recycling of GPR addresses is accomplished through the interaction between the CVT and the rename 2 register 18. Sequentiality is maintained through the requirement that destination addresses be released in pointer defined order, which pointer is indexed through successive CVT rows by finish bit indication that the destination data is available and valid.

Consider a first example. With reference to FIG. 4, as an instruction comes in it is, simultaneous with other instructions, subject to the operation of the rename 1 register 12. As shown, the source 1 and source 2 addresses, originally specified as 1 and 2, are translated. The result addresses of 1 and 2 are because the rename 1 register was so initialized. In contrast, the original destination 0 address is through CVT translation assigned the first available physical address 32, and in succession causes the placement of the physical address 32 in the rename 1 location adjacent to the original destination 0 logical address, and the setting of a lock bit adjacent the assigned physical address in the general purpose register 17. At this time, the control word generated as a consequence of the actions is composed of a CVT pointer directed to the first row, in the first CVT table, the original opcode, a destination address 32, a source 1 address of 2 and a source 2 address of 1. Such control word is entered into the control word queue 13 and has associated therewith a valid flag indicating availability to the execution units. The valid flag associated with that entry in the queue is reset upon completion of the specified operation by the execution unit assigned the control word.

Register recycling and sequentiality control are accomplished through the interaction of the CVT table 11 with the rename 2 register 18. Since the order of the CVT table reflects the order of the instructions as originally defined by the programmer, a pointer indexed to the CVT table ensures that control word retirement coincides with the original order of the instructions. The pointer indexes and responds to a bit in the finish column indicating that the control word operation has been completed. Though the bit is set when the execution unit completes the assigned control word, the indexing of the pointer occurs only when all preceding control words in the original instruction succession defined by the table entries have been executed. The retirement of a finish bit from the finish column also initiates an exchange of addresses, between the CVT table and the rename 2 register, so that the address previously in the physical location of the CVT table row in question is exchanged with the address in the rename 2 register corresponding to the logical address in the CVT table. See the schematic depiction in the lower-right region of FIG. 4. Thereby, general purpose register addresses are recycled. Locking and unlocking the destination register in the general purpose register ensures consistency when dependencies exist. The ordered recycling of registers based upon the original order of the input instructions ensures sequentiality.

Figure 5A:
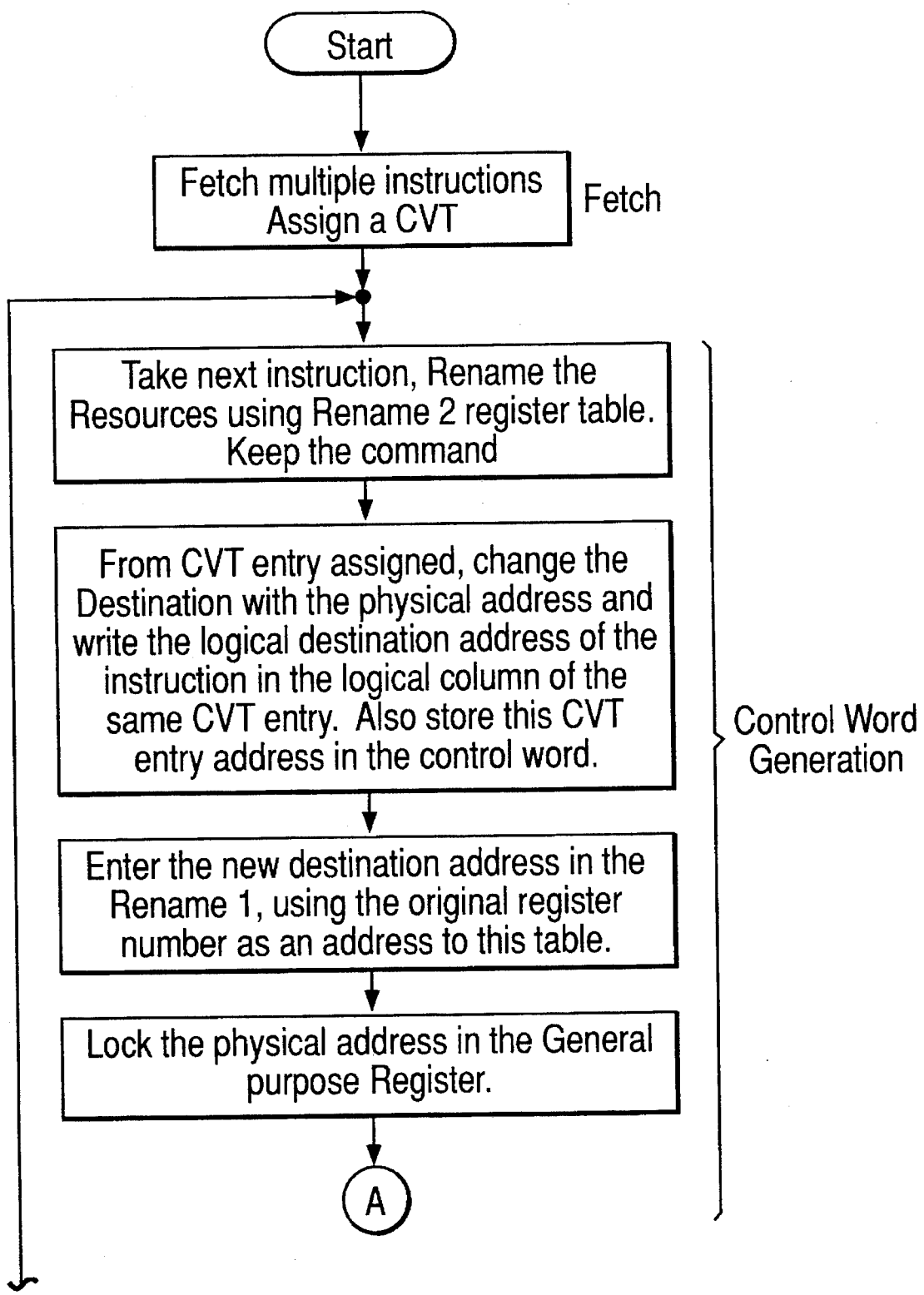
FIGS. 5A, 5B and 5C together depict by schematic flow diagram the method characterized by the present invention.
Figure 5B:
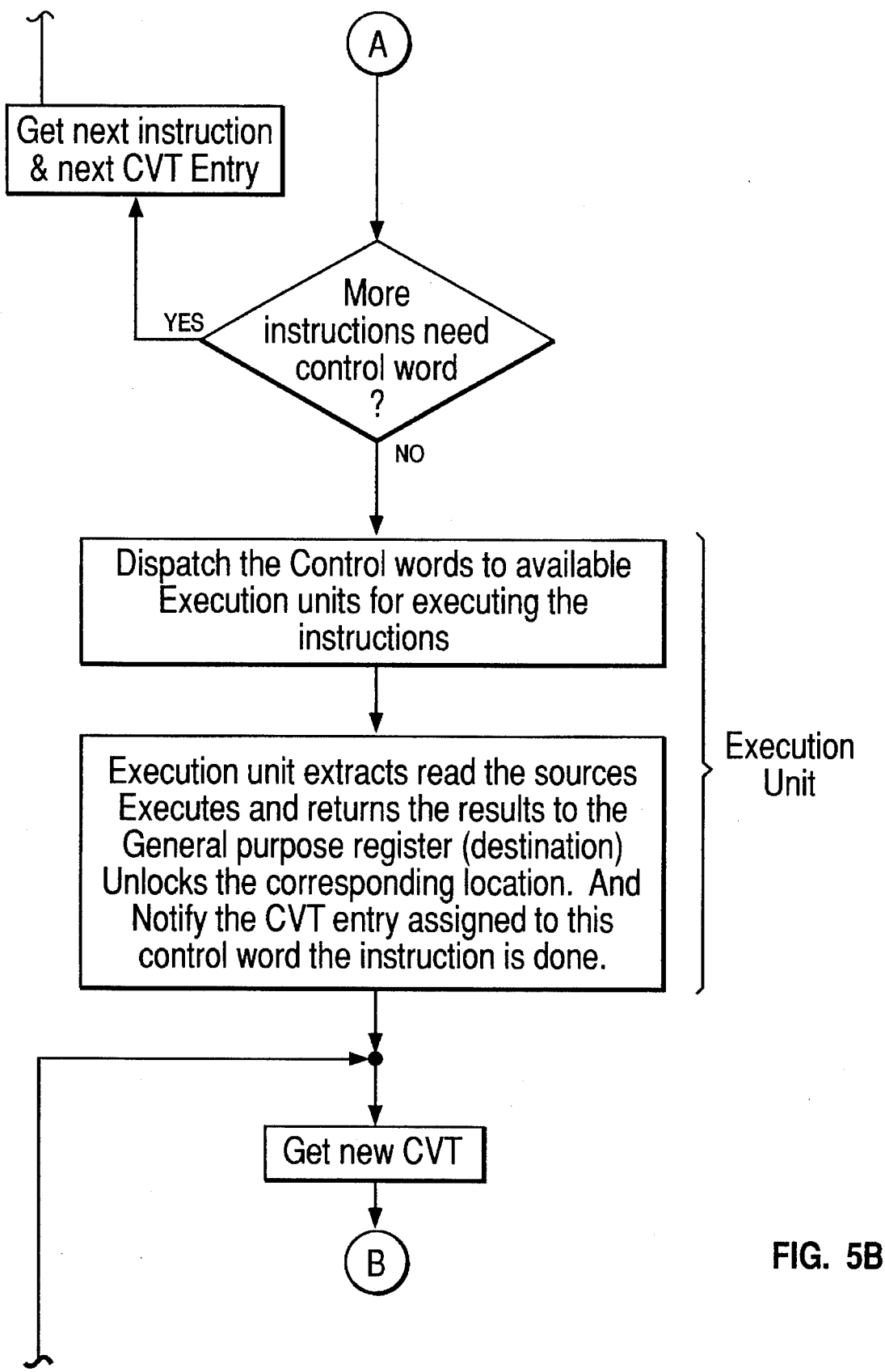
Figure 5C:
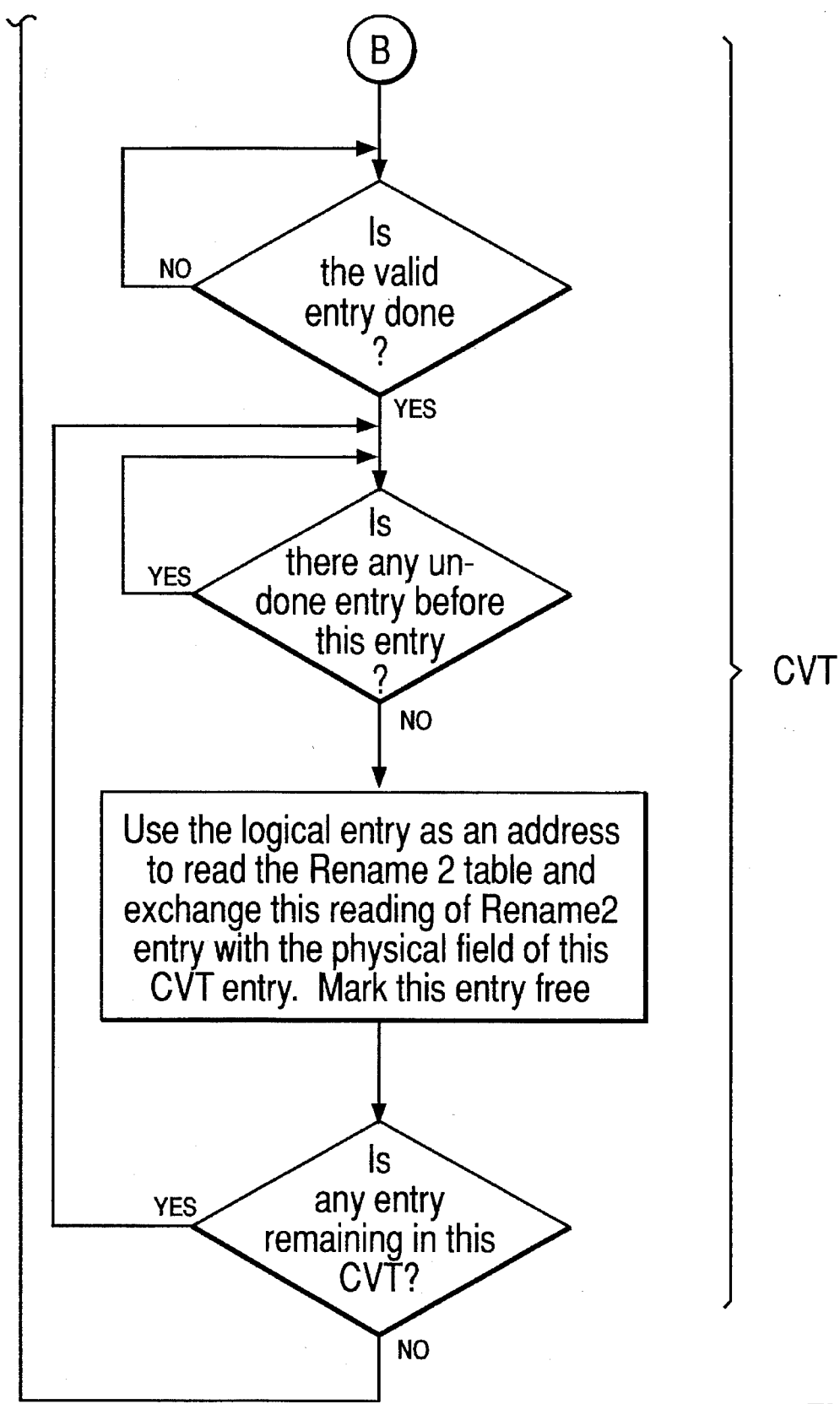

The steps in a method for operating a super scalar architected computer to allow out-of-order execution of instructions are set forth by flow diagram in the combination of FIGS. 5A, 5B and 5C. The fetching of multiple instructions is followed by a renaming of the source registers using rename register 1, and followed in succession by renaming the destination register using an address from a physical entry in the next available row of CVT table while entering the original destination register address in the logical entry of the corresponding CVT table row. The new destination address is also entered into the rename 2 register, and the physical address in the general purpose register is locked. The renamed source and destination addresses are then combined with CVT address information and the opcode to form the control words. Control words are queued and dispatched to next available execution units. Processing by the execution units commences when all related source addresses are unlocked. The results of the execution units are written to the renamed destination registers and such registers are then unlocked. The CVT and the rename 2 register addresses are exchanged for recycling general purpose register addresses. The process repeats for successive instructions.

The next example considers in detail the renaming and recycling of register addresses in the context of a specific set of contentious instructions and specific data. The number of general purpose registers (GPRs), CVT tables, execution units, instructions fetched per cycle, etc. used in this example are for illustration only. The architecture can support any number of these resources. The add, divide and multiply instructions were also selected to be illustrative.

Figure 6:
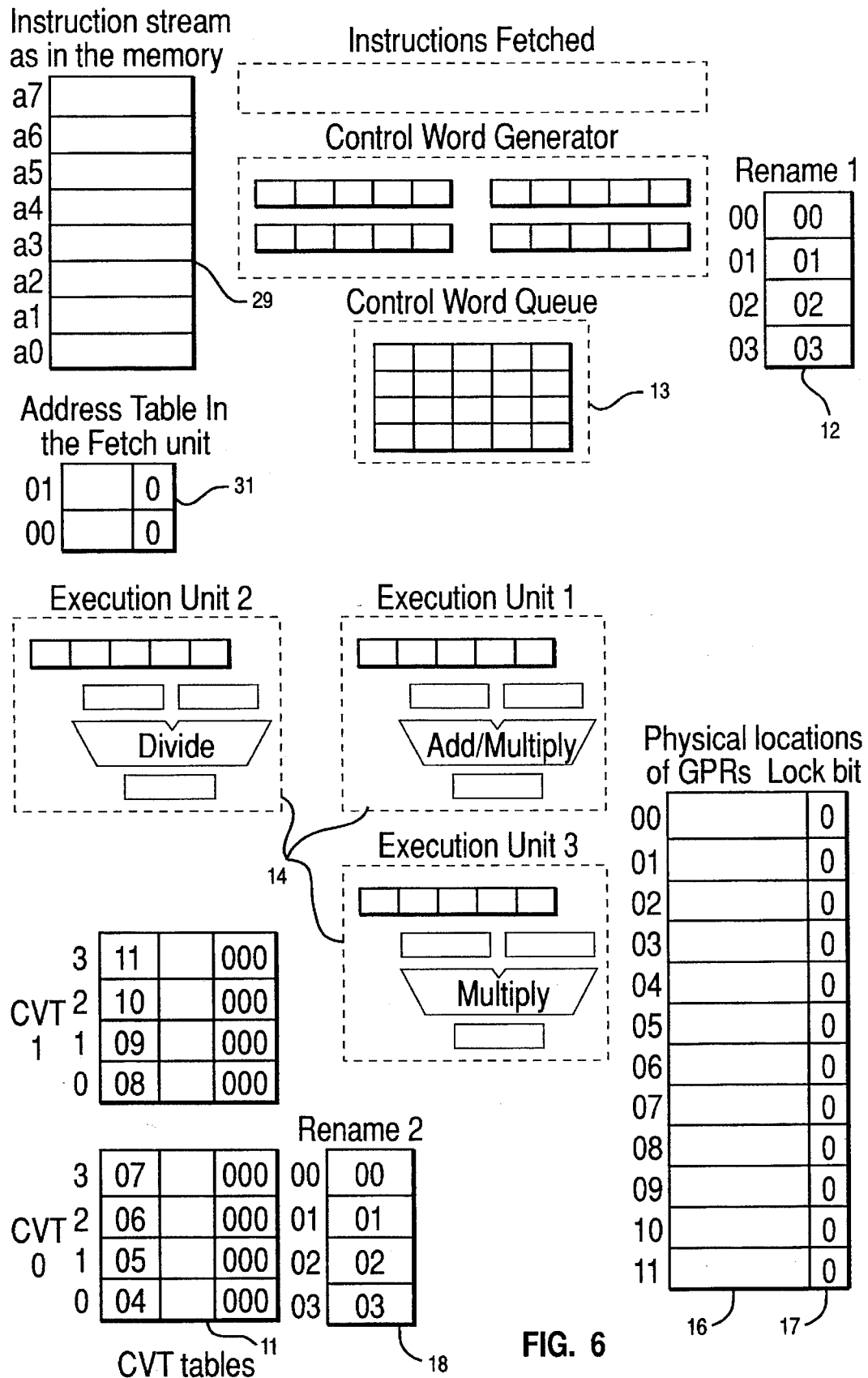
FIG. 6 schematically illustrates the register contents of an example system managing a set of example instructions.

As first shown in the FIG. 6, this example includes a portion of main or cache memory 29, starting from address a0 and extending to a7, with each address having one instruction. A fetch unit (not shown) takes 4 instructions per clock cycle from the memory and identifies the block address of the fetched instructions in two entry table 31. Only two entries are needed because there are only two CVT tables in this example. Rename tables 12 and 18 each have 4 entries, the entries addressed from 00 to 03. Only 4 entries are present because the architecture of this specific example computer is defined to have 4 architected registers, correspondingly permitting the programmer to write instructions using only register R0–R4. Control word generator 9 creates a control word from each instruction, as shown in FIG. 3. Instruction queue 13 is a 4 entry deep buffer used to store control words. The depth is also arbitrary.

Execution unit 1 performs addition and multiplication. It takes one clock cycle to read the control word and one clock cycle to add and write the result back. In case of multiplication, it takes one clock cycle to read and two clock cycles to execute the multiplication and write the result back to general purpose register 16, where the data is actually stored. Execution unit 2 divides. It takes one clock cycle to read the control word and 6 clock cycles to finish the divide operation and write the result back. Execution unit 3 multiplies. It takes one clock cycle to read the control word and 2 clock cycles to finish the multiple operation and write the result back.

General purpose register 16 has 12 entries. Four are required and the 8 other entries are used in renaming. As noted earlier, the number of such registers is equal to the sum of the system architected registers (four in count) plus the number of CVT entries (two tables of four entries each). All entries store data. Two CVT tables 11 are used in this example, each with 4 entries to handle the 4 control words per clock cycle. As defined in this example, the first CVT table has a base address of 0, the other has a base address of 1. The entries into the individual rows of each CVT are addressed from 00 to 13, the most significant bit corresponding to the CVT base number. Each CVT row entry has three fields, one to hold the physical address for renaming, the second to hold the programmer's architected register address as defined in the original instruction, and the third field holding flags or indicators necessary for the specific implementation. For this example there are three flag bits, individually indicating that the entry is in use, the instruction has been executed, and that the instruction has caused an interrupt. The physical entries are initialized with addresses 04 to 11, starting from entry 0 of CVT 0 and extending to entry 3 of CVT 1. These addresses (04–11) together with the addresses first assigned by Rename 1 (00–03) cover all the twelve addresses (00–11) available in the GPR.

Figure 7:
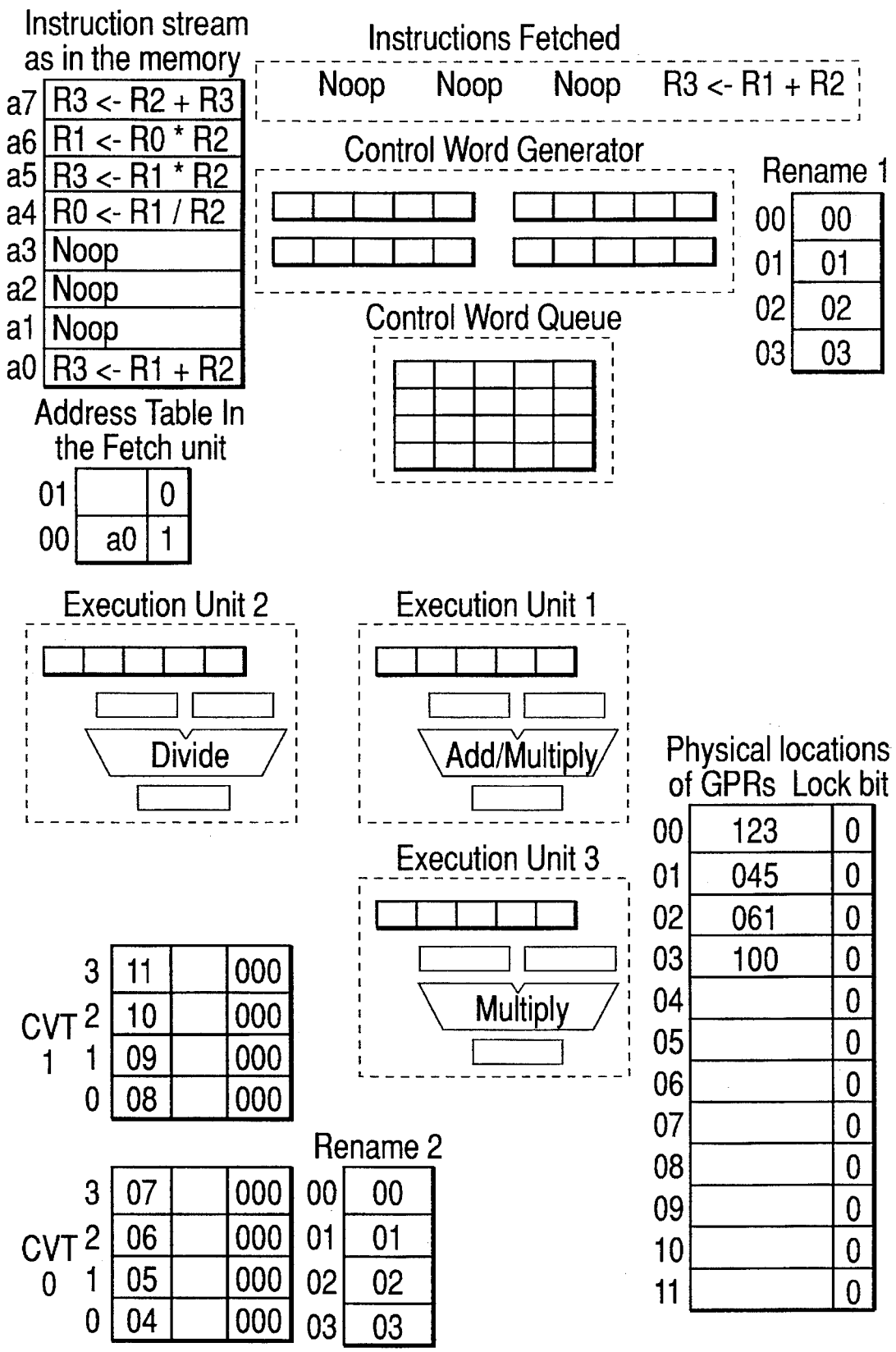
FIG. 7 schematically illustrates the register contents of an example system managing a set of example instructions.

The example begins with the initialized register states in FIG. 7. The goal is to navigate instructions through this architecture and thereby examine how the instructions flow through the system. The general purpose registers 00 to 03 are already loaded with data, having values 123, 45, 61, and 100, consecutively. Since the fetch unit fetches 4 instructions per clock cycle the fetch acquires an add instruction from address a0 and three Noop (no instructions) from the subsequent memory locations.

The add instruction is: R3←R1+R2.

According to this add instruction, the content of the first register (01) must be added to the content of the second register (02), and the result stored in the third register (03). This was defined by the programmer using the four architected register 01–03 of which he or she was aware. At the end of the execution of this instruction the content of the general purpose register corresponding to R3 must contain the value 106, which is the sum of 45 and 61. Events occur every clock cycle.

Upon the first clock cycle, the fetch unit acquires the set of four instructions beginning with a0. Also the first available CVT table (CVT0) is selected. The fetch unit address table entry 00 is flagged using 1, to show use, and the memory address a0 is entered. Instructions in memory locations a0–a3 are fetched.

During the second clock cycle, the control word generation logic creates a control word from each instruction. The CVT0 is assigned to the four instructions, using entry 0 for the first instruction (the add instruction) and the entries 1, 2 and 3 for the next three instructions (the Noop instructions).

Figure 8:
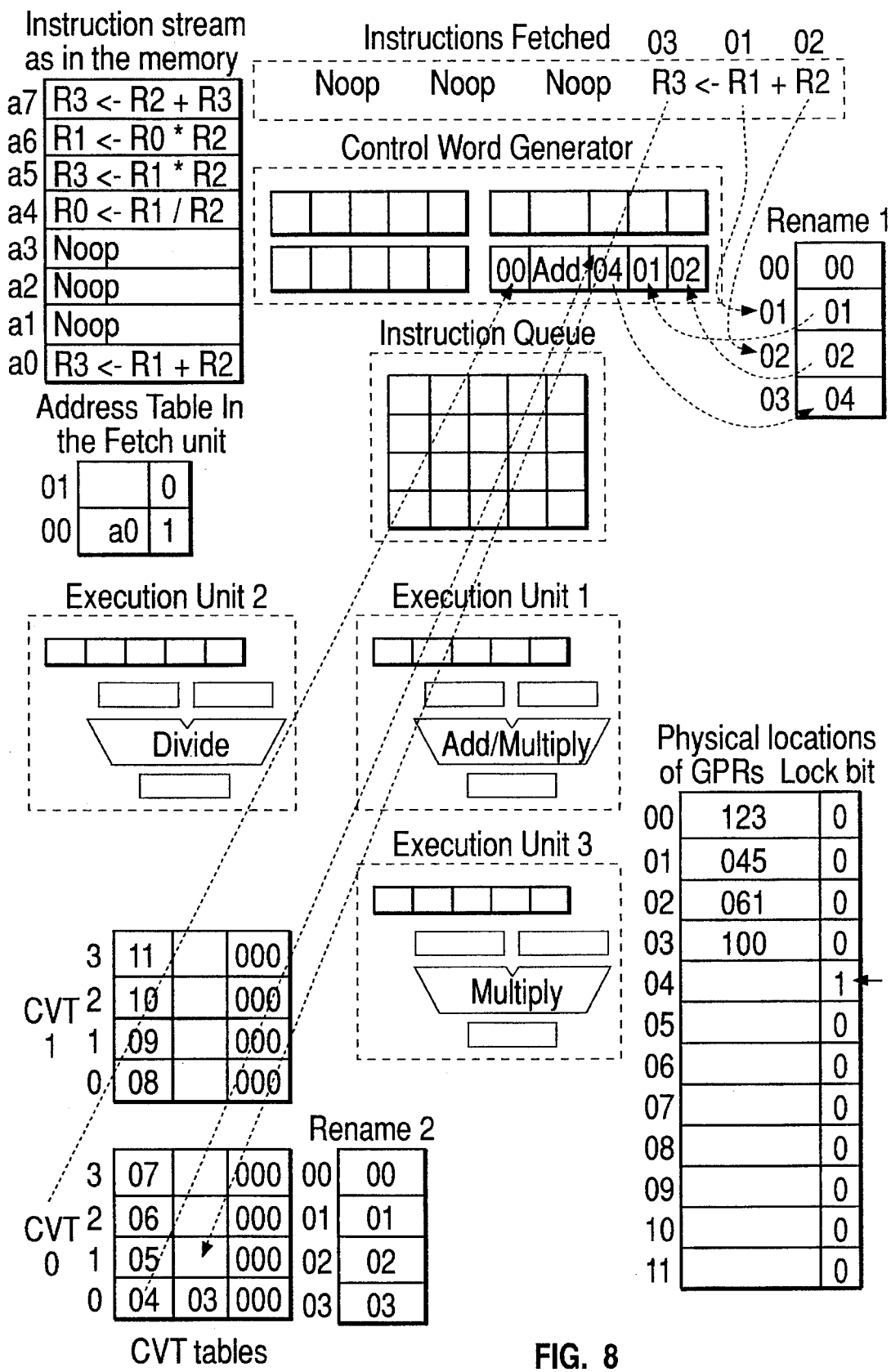
FIG. 8 schematically illustrates the register contents of an example system managing a set of example instructions.

The control word for the first instruction is created following the procedure shown in the FIG. 3 as to the CVT address, opcode, destination address and source addresses. Now see FIG. 8. The CVT field takes the CVT base number and row number assigned to this instruction. Since the CVT base number is zero and the row number is zero, the field becomes 00. The opcode field of the control word will contain the original add instruction with no change. The destination location uses the number in the physical field of the 00 row entry of CVT table, which is 04, and puts the original destination number 03 in the logical entry of the CVT row. The source registers are renamed using the Rename 1 register. Using R1 and R2 as addresses to the Rename table, the existing entries are used to replace the R1 and R2 source entries. In this case, R1, takes the value 01 and R2 takes the value 02.

The original instruction used destination R3. Since the destination entry in the control word is now designated to be general purpose register address 04 by CVT address 00, the 04 register address is placed into the 03 entry of the Rename 1 table. Also, the GPR physical location 04 is locked. The CVT 0 entry 0 is marked as occupied by the first bit in its flag entry. No control words are generated for the other three instructions because they are Noops.

Figure 9:
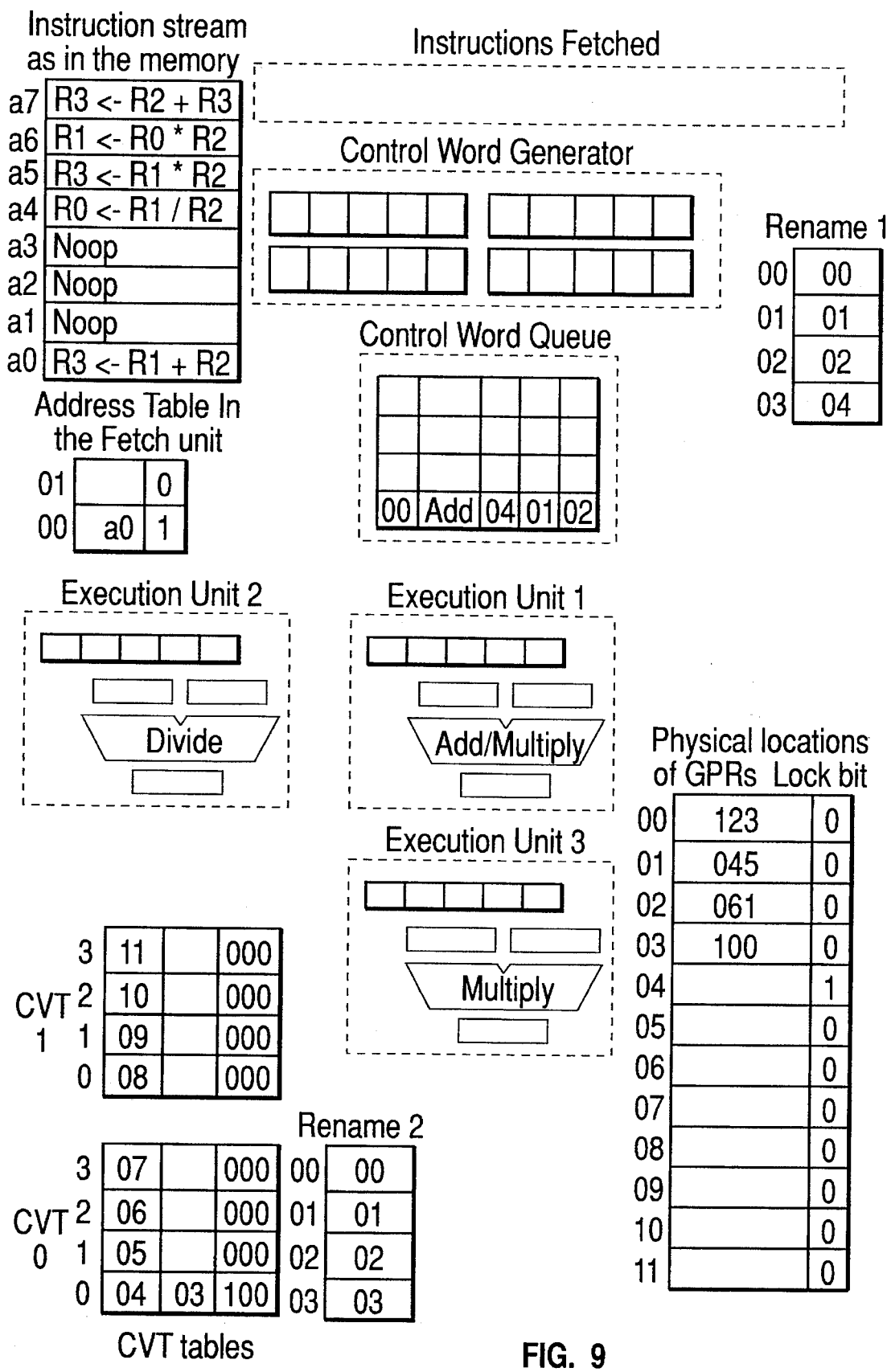
FIG. 9 schematically illustrates the register contents of an example system managing a set of example instructions.

Clock cycle 3 dispatches the control words to the execution units. If the execution units are not busy, they take the control word directly from the control word generator. If they are busy executing other instructions, the control words are stored in the control word queue until one or more execution units is available. See FIG. 9, where the control word is stored in the control word queue.

Figure 10:
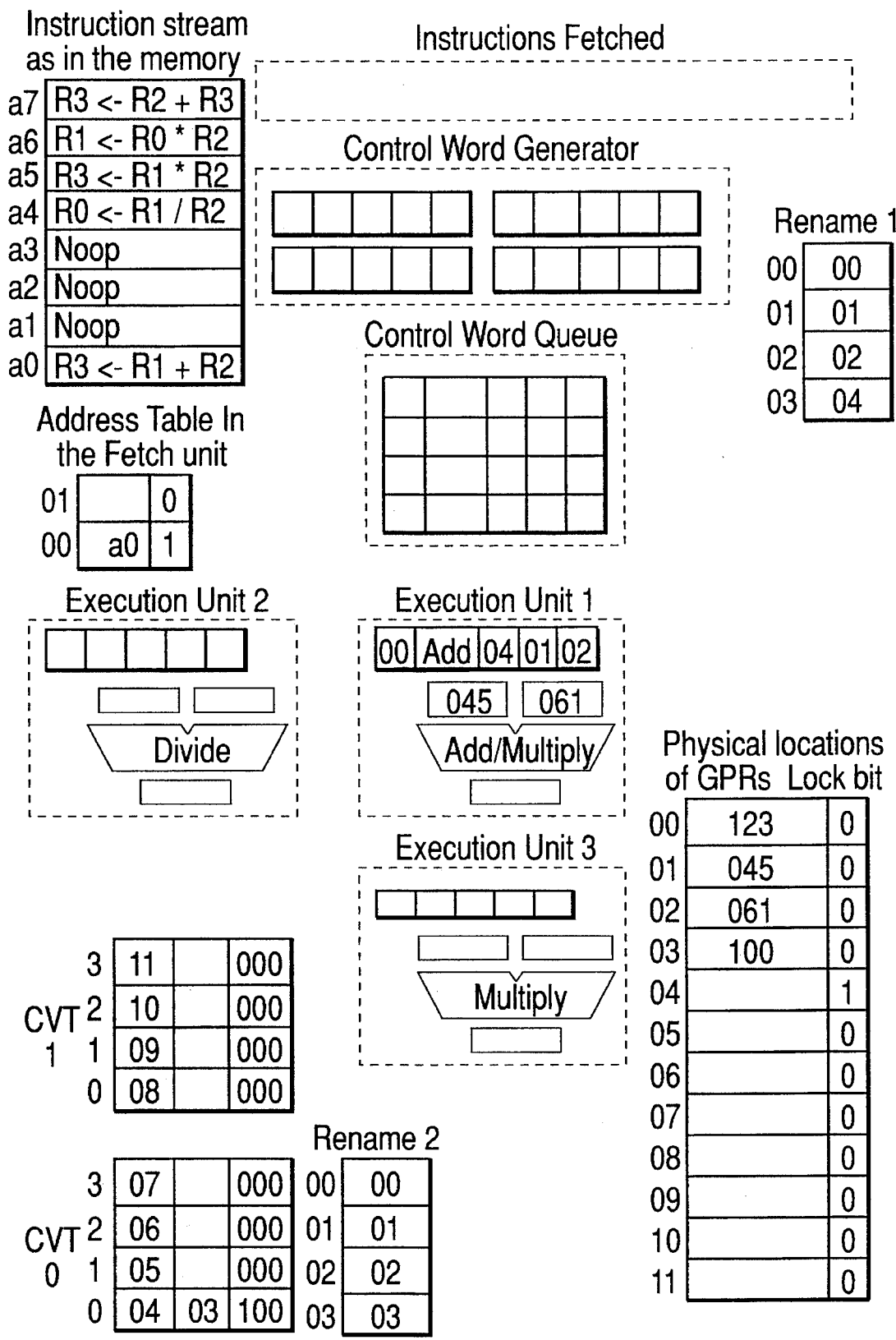
FIG. 10 schematically illustrates the register contents of an example system managing a set of example instructions.

With clock cycle 4, execution unit 1 takes the control word, decodes it, and then reads from the physical locations in the GPR the data which the addresses identify. As shown in FIG. 10, source locations 01 and 02 have data 45 and 61, respectively.

Figure 11:
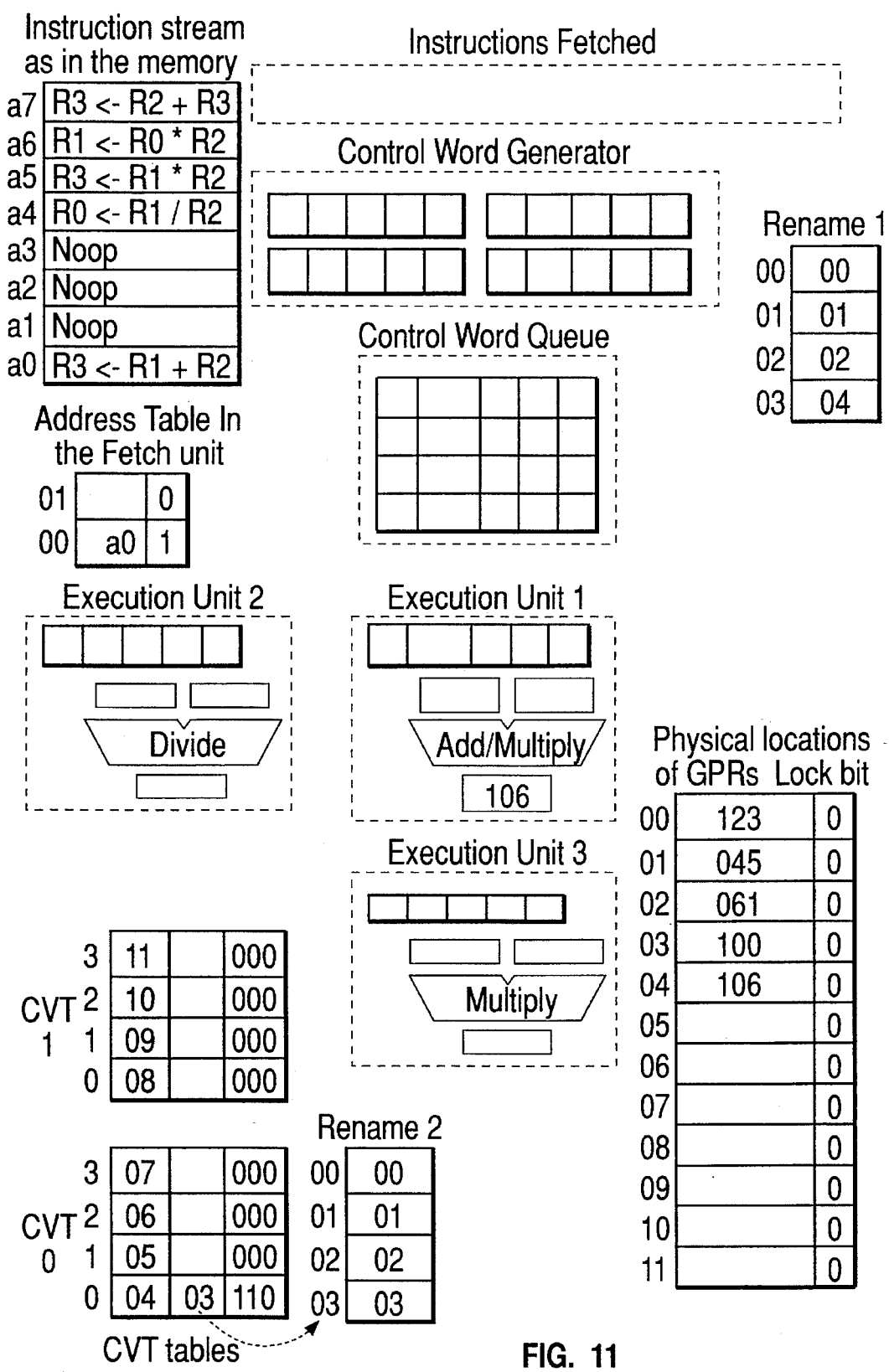
FIG. 11 schematically illustrates the register contents of an example system managing a set of example instructions.

During clock cycle 5, as depicted in FIG. 11, the 106 result of the addition in execution unit 1 is written to the destination location in the GPR, which by the control word is 04, and the lock bit associated with this location is switched to 0. The CVT0 entry 0 finish flag bit is switched to 1.

Figure 12:
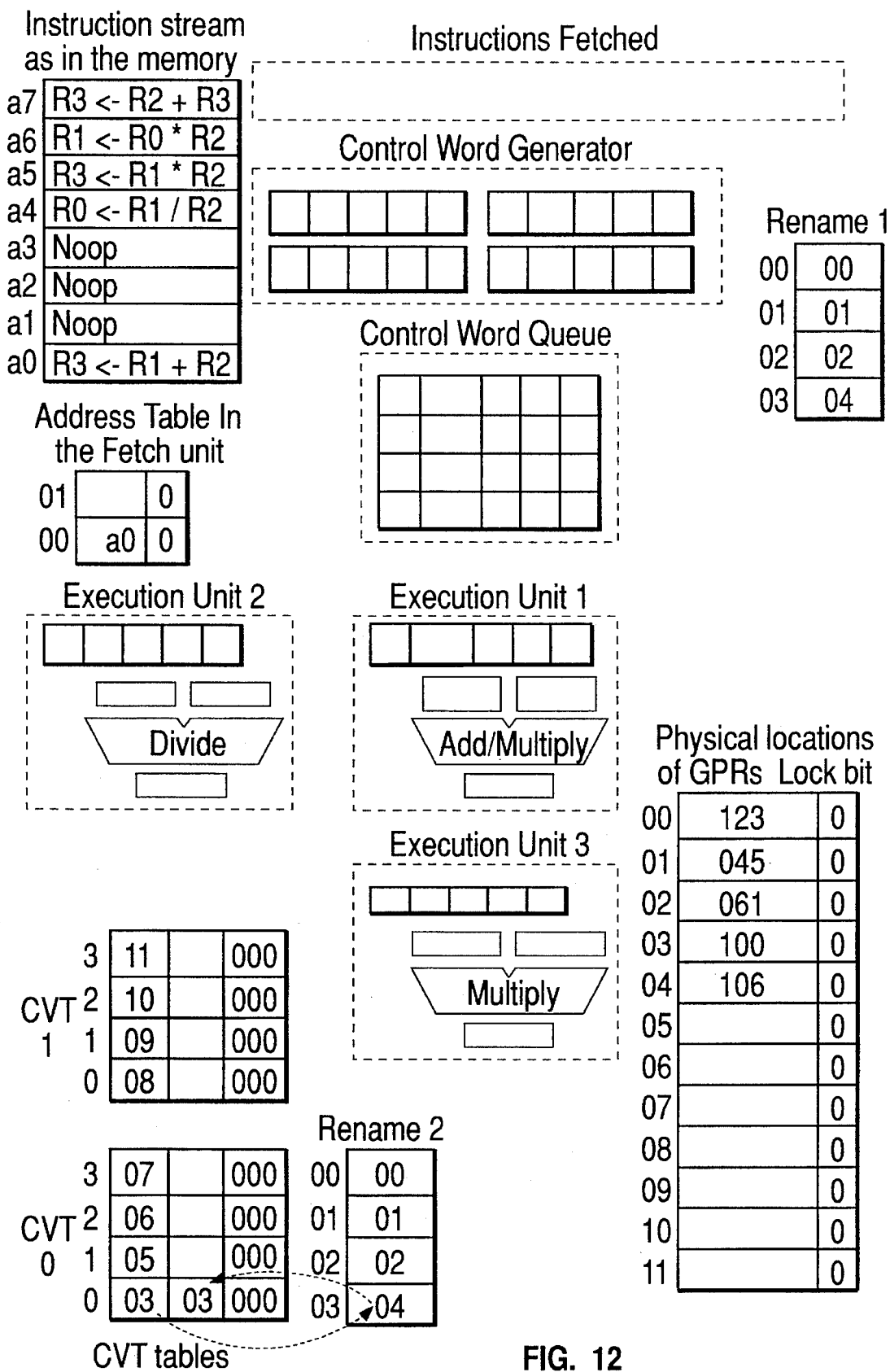
FIG. 12 schematically illustrates the register contents of an example system managing a set of example instructions.

Clock cycle 6 initiates the final operations on the first group of 4 instructions. The beginning states appear in FIG. 11 and transition to those in FIG. 12 upon completion. The finish flag for CVT entry 00 initiates the use of the corresponding logical entry 03 as a pointer to a row in Rename 2. Row 03 in Rename 2 also contains the address 03. See FIG. 11. The physical entry address 04 and Rename 2 register row 03 contents address 03 are exchanged. After the exchange, the CVT0 row entry 0 physical location contains address 03, and row 03 of Rename 2 contains address 04. See FIG. 12. The address table entry 0 of the fetch unit is made 0 to show that CVT0 is no longer in use. This completes the execution of the instructions obtained during the first fetch.

Figure 13:
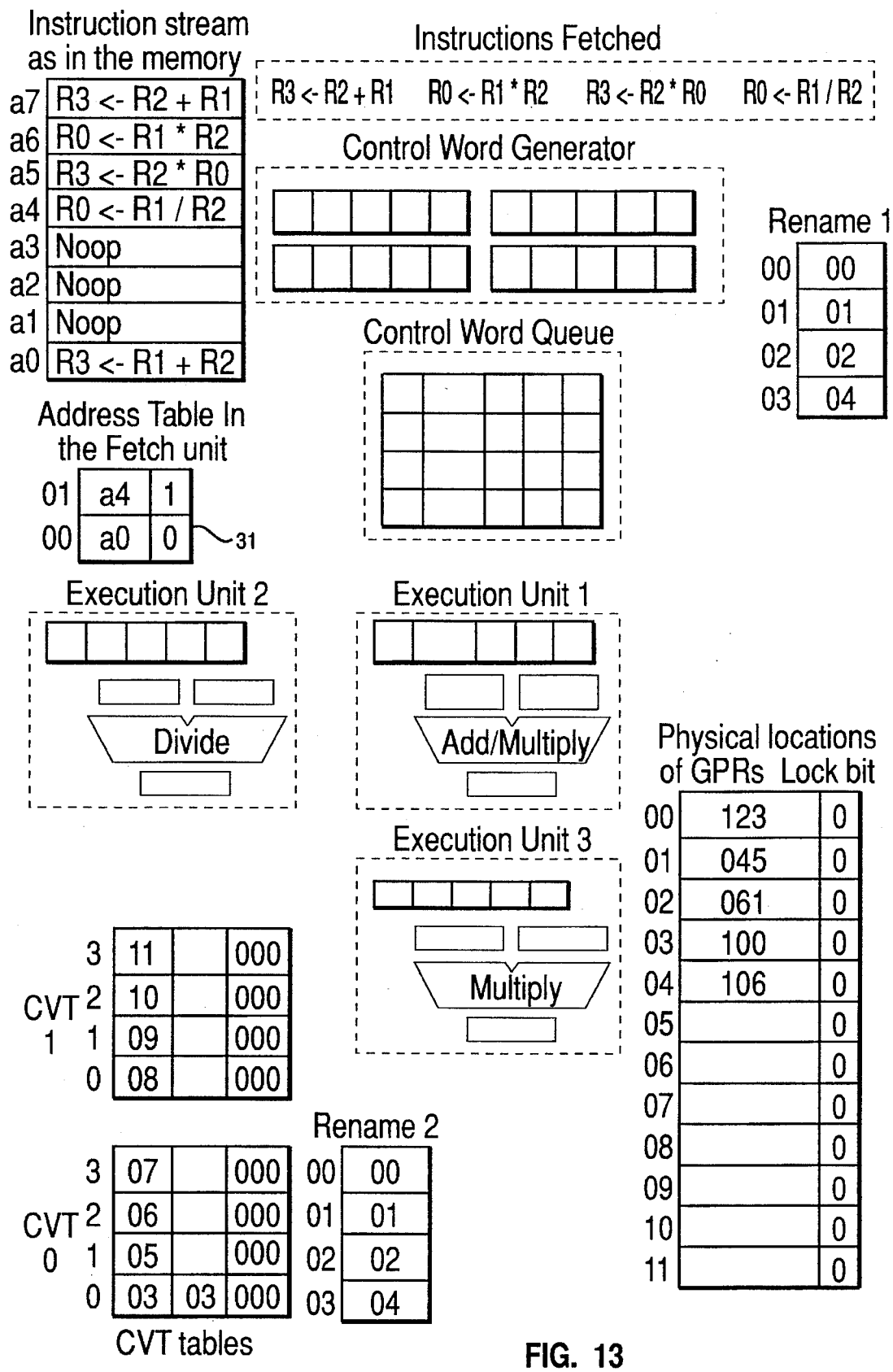
FIG. 13 schematically illustrates the register contents of an example system managing a set of example instructions.

The instruction result data of 106 is in architected register R3 as defined by the address translation through the Rename 2 register where address 03 is translated to an actual GPR address The next set of 4 instructions fetched appear as depicted in FIG. 13. This set will demonstrate certain hazards and how they are resolved in this architecture. For this reason the next 4 instructions in the memory involve a mix of division, multiplication, multiplication and addition. These instructions start with address a4 and extend through a7. The instructions are as follows, with the numerical results in parenthesis:

R0←R1/R2 . . . (R0=045/061=0.74)
R3←R2*R0 . . . (R3=061* 0.74=45.14)
R0←R1*R2 . . . (R1=045* 061=2745)
R3←R2+R1 . . . (R3=061+045=106)

The first instruction is a multicycle instruction requiring 6 clock cycles to execute and write back result data to the general purpose registers. The second instruction is also multi cycle instruction, but requires only 2 clock cycles to execute. A hazard exist between these two instructions. One of the sources of the second instruction is the destination (the result) of the first instruction. Therefore, a Read After Write (RAW) hazard exists. The second instruction must not start reading until the first instruction finishes and writes the result. The present architecture resolves this hazard without communications between all execution units, without operand comparisons, without checks among the execution units, and even without the implementation of shelving methods.

The third instruction is also multicycled, taking 2 clock cycles to execute. There are two different hazards in this instruction. First is a Write After Read (WAR), wherein the execution unit may generate a result (R0) and write it back to the GPR before the second instruction reads its source from R0. If that happened, the second instruction will read the wrong data. The second hazard is a Write After Write (WAW) hazard, because the destination of the first instruction and the second instruction are the same. It is possible for the second instruction to finish before the first one and thereby cause an error in the result data of register R0. Table A sets forth the states of the four registers by instruction and in the absence of errors.

TABLE A

|    | Initial State | Divide First Instruction | Multiply Second Instruction | Multiply Third Instruction | Add Fourth Instruction |
|----|---------------|--------------------------|-----------------------------|----------------------------|------------------------|
| R0 | 123           | .74                      | .74                         | 2745                       | 2745                   |
| R1 | 45            | 45                       | 45                          | 45                         | 45                     |
| R2 | 61            | 61                       | 61                          | 61                         | 61                     |
| R3 | 106           | 106                      | 45.14                       | 45.14                      | 106                    |

Upon the conclusion of the four instructions the registers should contain the following values:

R0=2745

R1=045

R2=061

R3=106

Upon the first clock cycle the fetch unit advances to the next 4 instructions in memory, beginning with address a4 and extending through a7.

CVT1 is used for this set of four instructions because it is next in the order of available CVT tables. The use of multiple CVT tables, likely to be four or more in an actual application, allows concurrency of operations for successive fetches, such as the comparisons of register allocations following a fetch, the assignment of renamed registers, and the concluding exchanges of addresses to recycle registers. Address a4 is placed in the address table of the fetch, block 31 in FIG. 13 to identify the block of 4 instructions associated with CVT table 1.

Figure 14A:
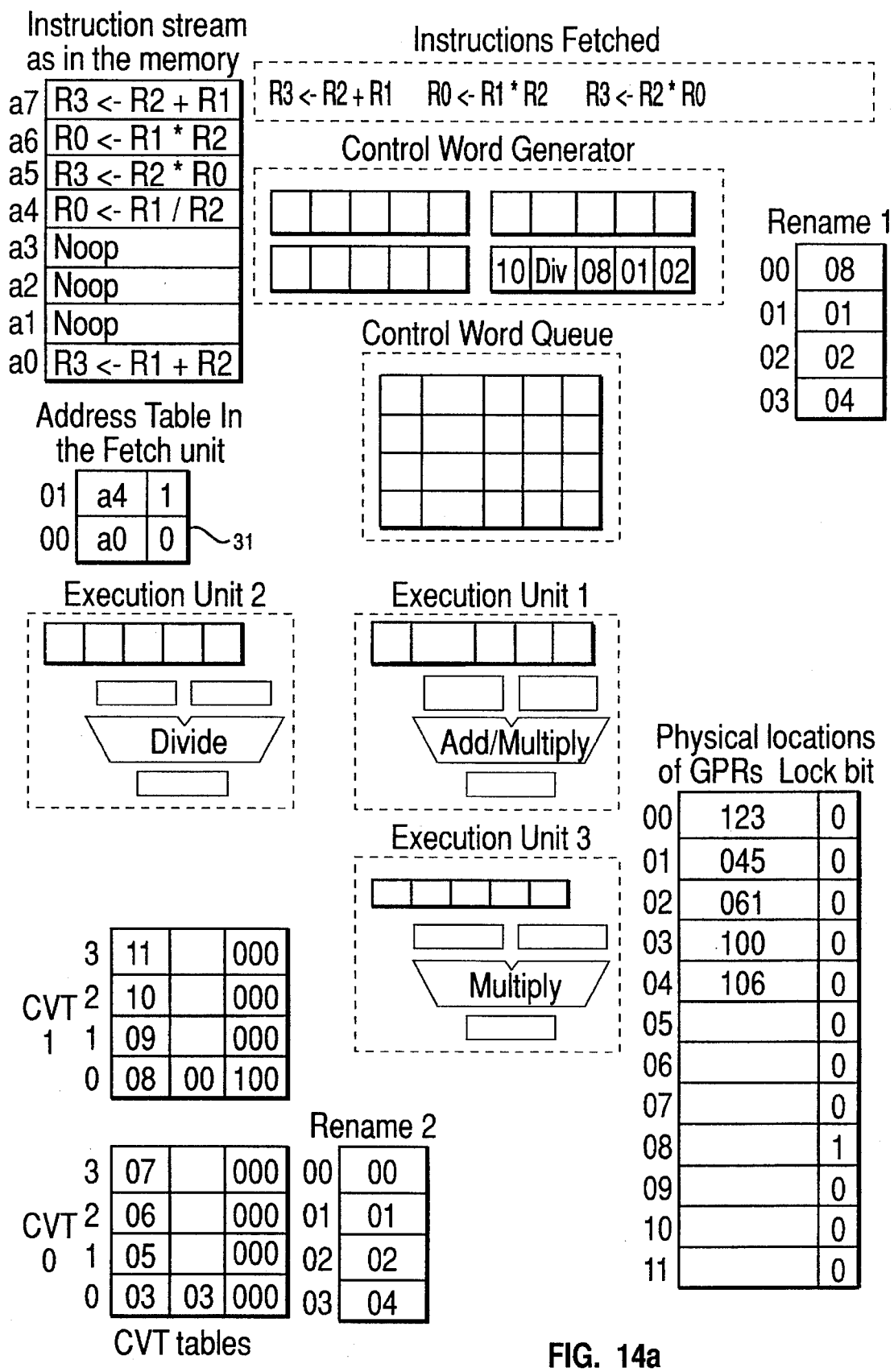
FIGS. 14a, 14b, 14c, and 14d schematically illustrate the register contents of an example system managing a set of example instructions.
Figure 14B:
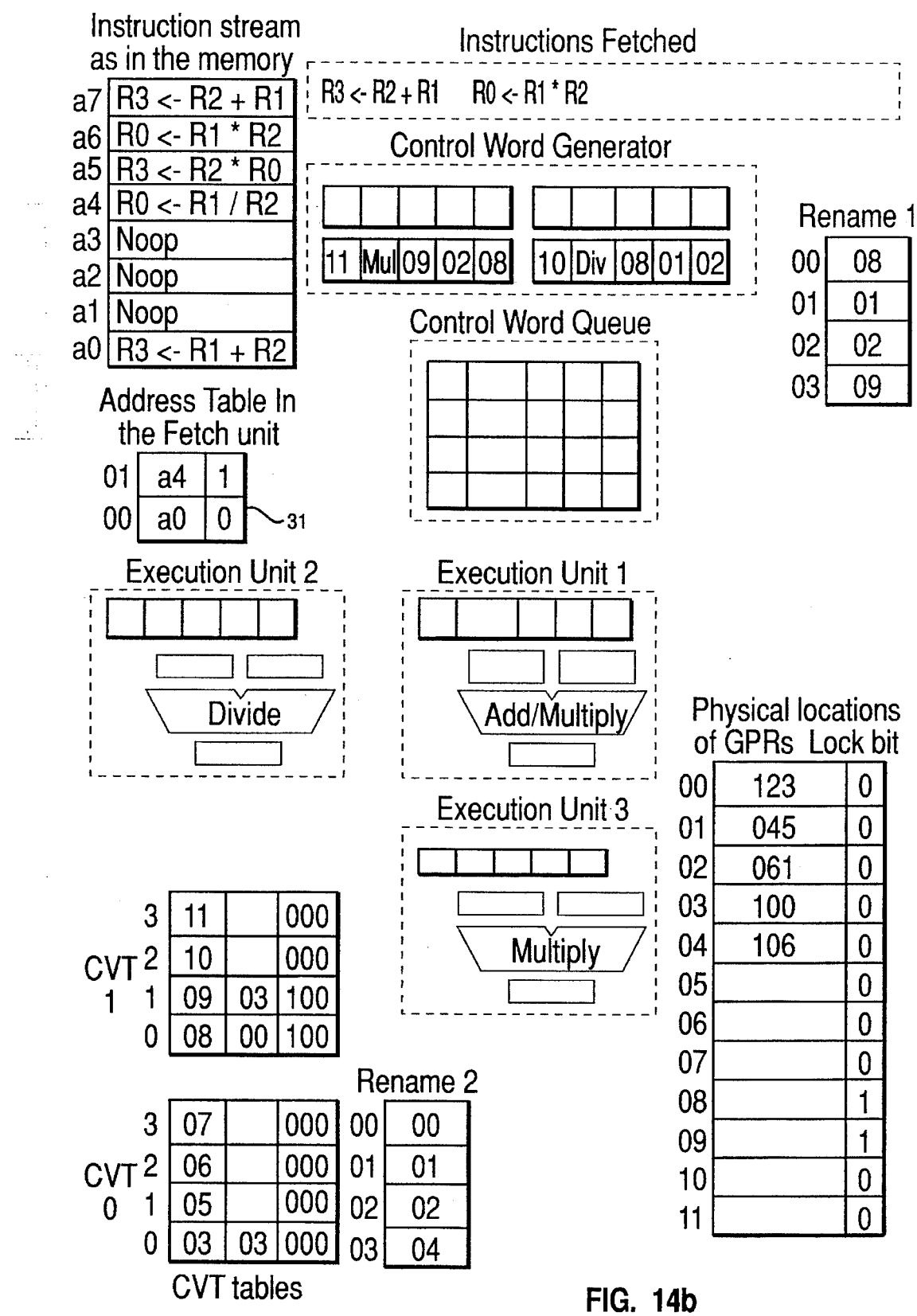
Figure 14C:
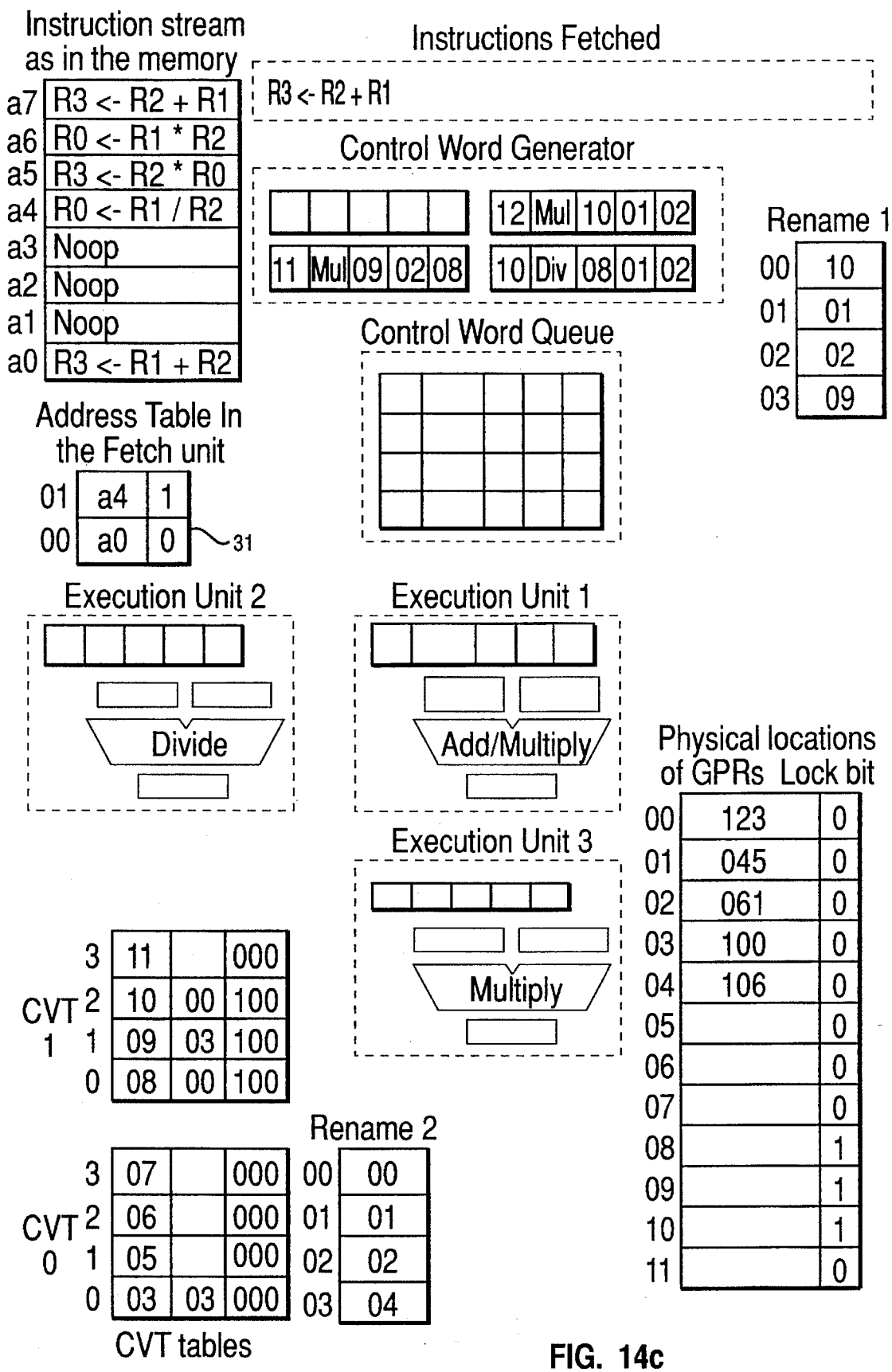
Figure 14D:
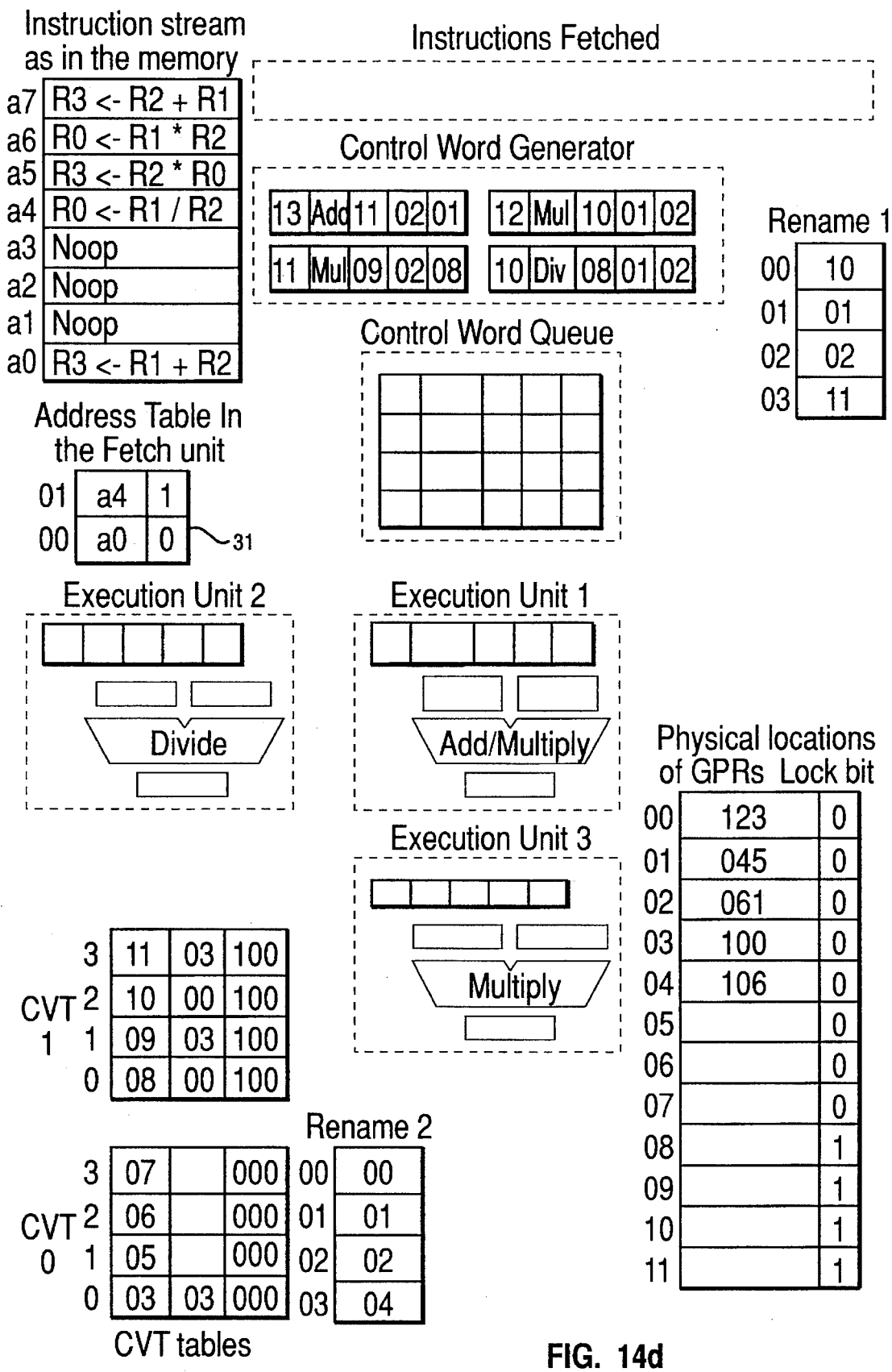
Figure 15:
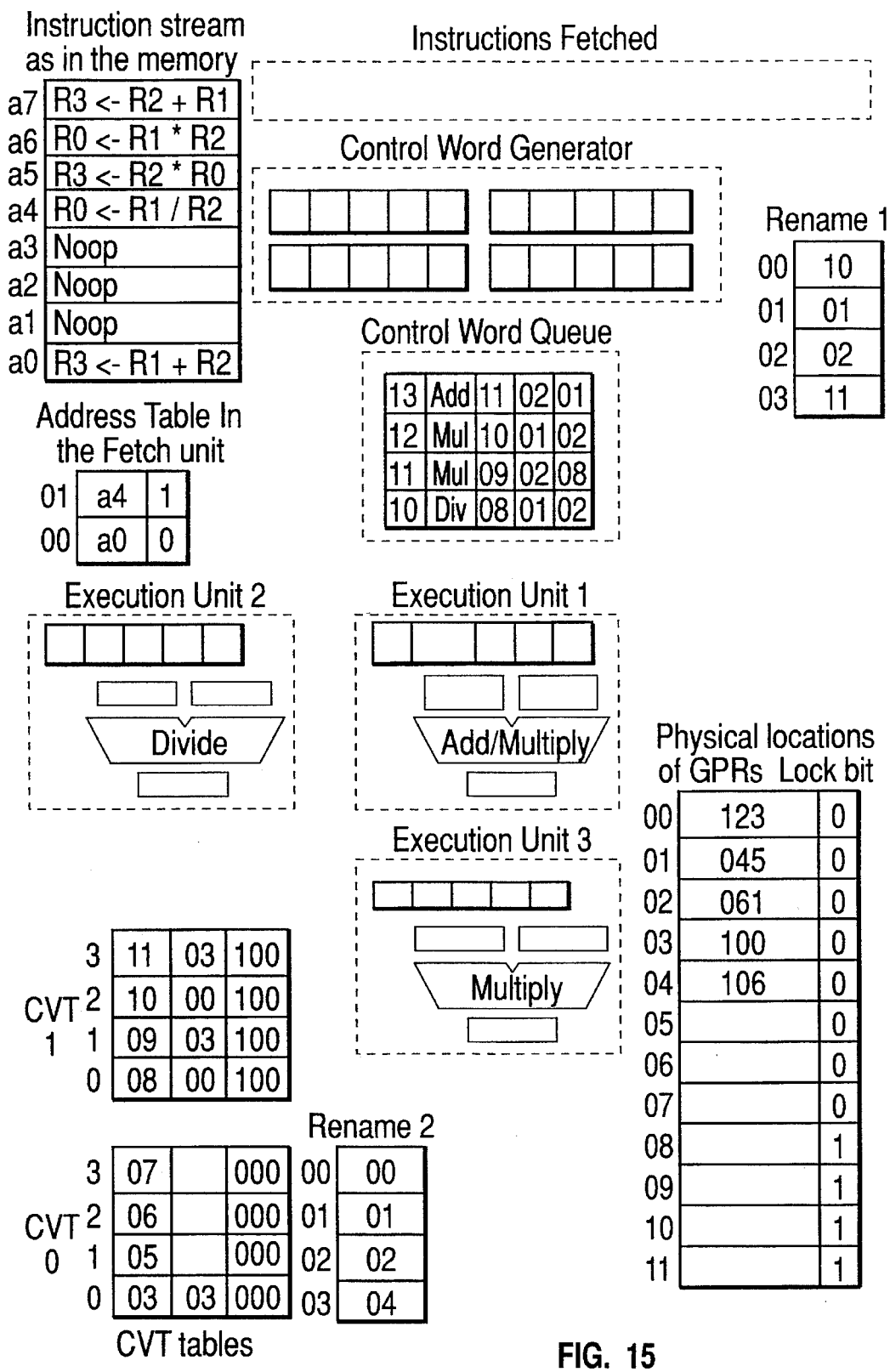
FIG. 15 schematically illustrates the register contents of an example system managing a set of example instructions.

With clock cycle 2 the control words are generated for each instruction using the procedure first described with reference to FIG. 3 and following the method described by the flow diagrams in FIG. 5a–5c. The effects associated with the generation of each of the 4 control words have been shown as individual FIGS. 14a–14d to minimize confusion. Normally these occur during a single clock cycle. The movements of addresses for each instruction are shown by dashed lines in the generation depicted in FIG. 8. The concluding control words appear in the control word generator as translated through CVT1 in FIG. 14d. CVT1 reflects the logical address entries and the setting of the in-use flags. Rename 1 reflects the final translations for registers R0–R3. Clock cycle 3 conveys the 4 control words into the control word queue as appears in FIG. 15.

The next, the fourth clock cycle dispatches the control words to appropriate and available execution units. Each execution unit then attempts to read its assigned addresses from the GPR. If an execution unit finds the lock bit set on the register it needs, it tries again in the subsequent clock cycle.

Figure 16:
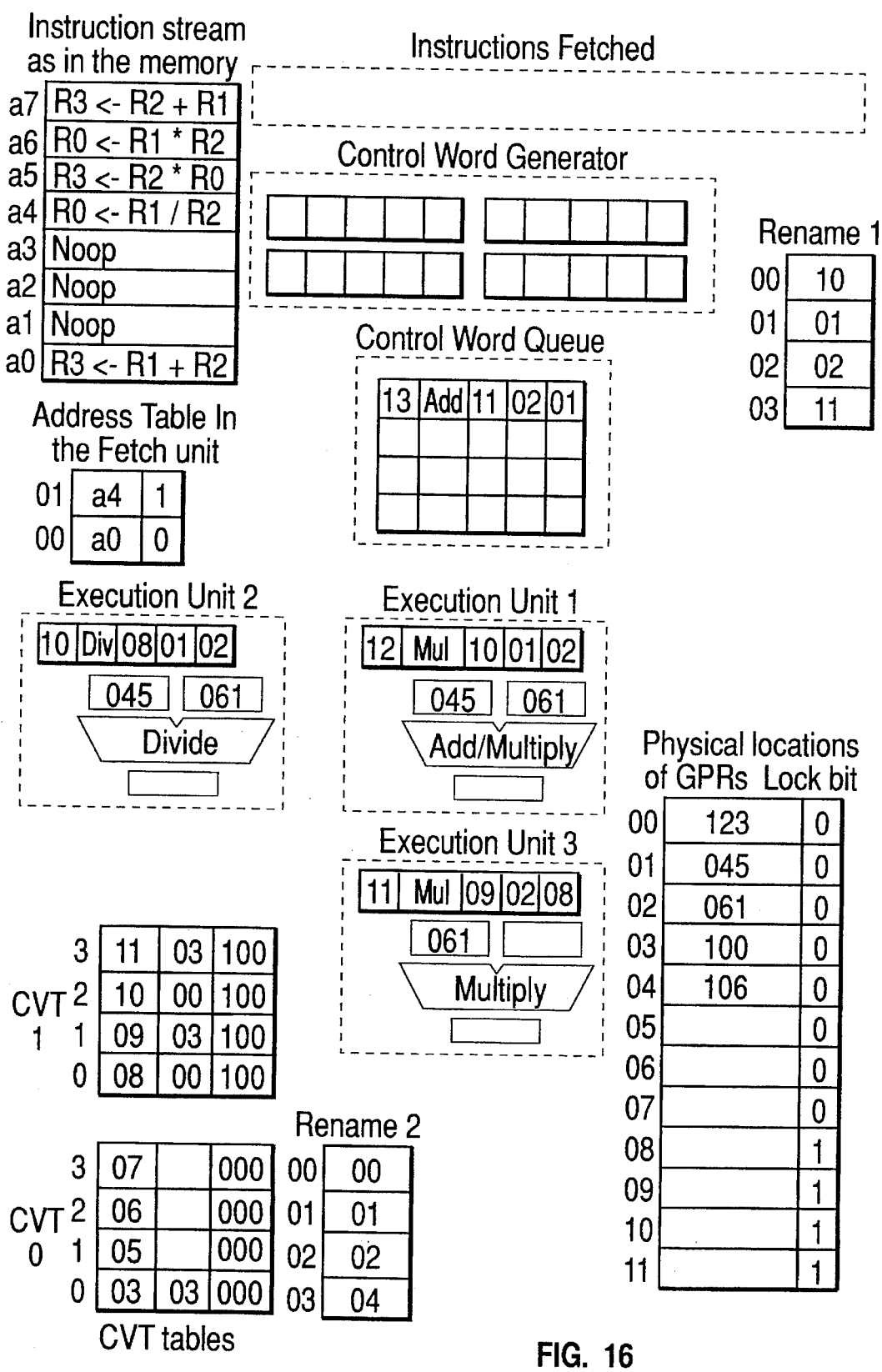
FIG. 16 schematically illustrates the register contents of an example system managing a set of example instructions.

As appears in FIG. 16, the first control word involves a divide operation and is accordingly dispatched to execution unit 2. The second control word involves a multiply and is therefore dispatched to execution unit 3. The third control word is dispatched to execution unit 1 for multiplication. The fourth instruction word stays in the control word queue until there exists an available execution unit that can handle an addition operation.

Note that execution unit 1 and 2 can read their source data from the general purpose register, because that data is not locked. On the other hand, execution unit 3 cannot read the source data in register 08 of the GPR because the lock bit is set. This unit repeatedly attempts to read with each successive clock cycle, until the register is unlocked.

During clock cycle 5 a number of events occur. Execution unit 1 finishes cycle 1 of 2 of the multiplication task. Execution unit 2 finishes cycle 1 of 6 of the division task. And lastly, execution unit 3 attempts to read the entry in register 08 of the GPR, but continues to be locked out.

Figure 17:
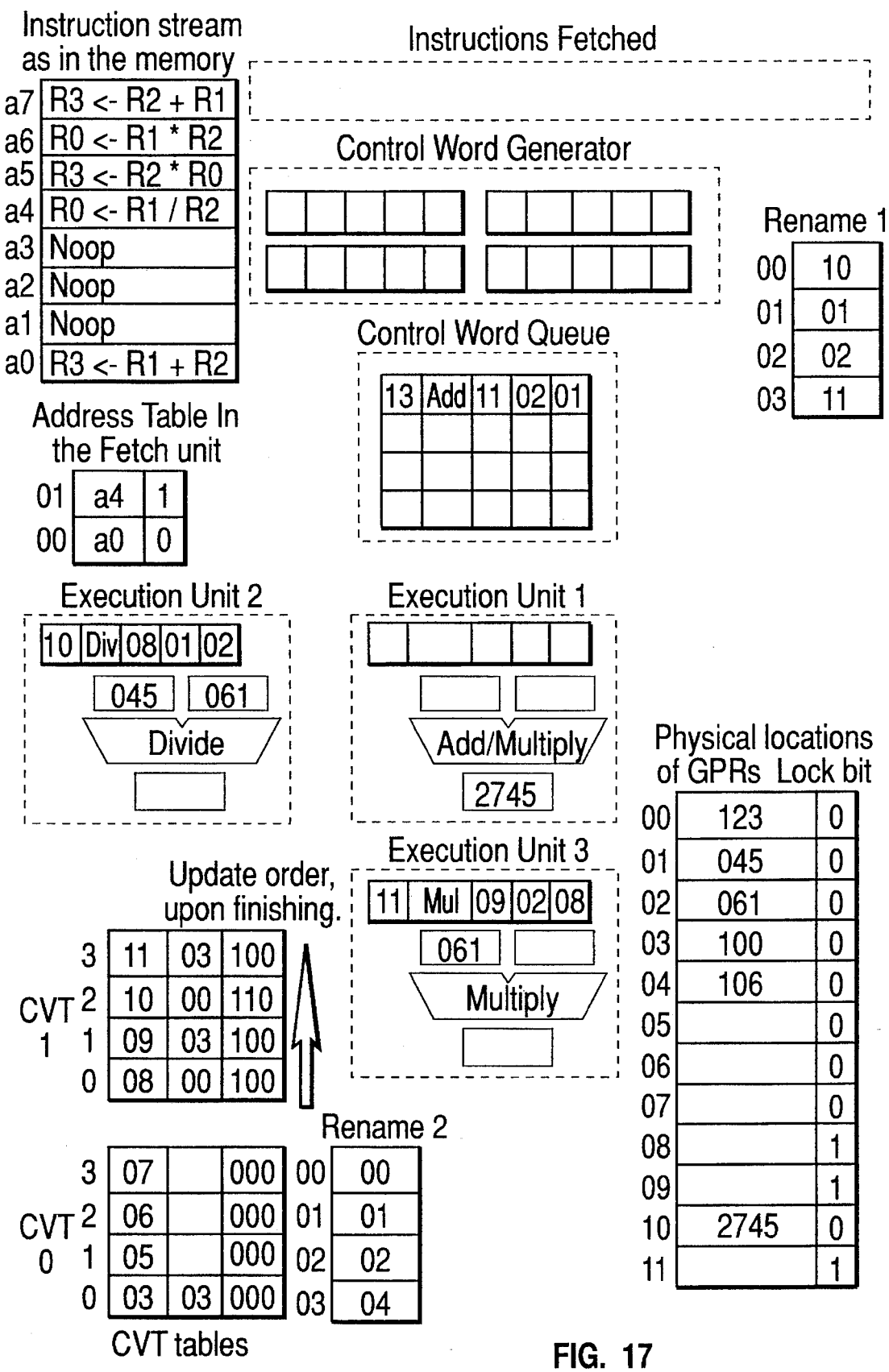
FIG. 17 schematically illustrates the register contents of an example system managing a set of example instructions.

With clock cycle 6 execution unit 1 finishes cycle 2 of 2, and then writes the result back to the destination GPR address 10, unlocks the register, and sets the finished flag in CVT 1 entry 2 associated with physical address 10. Execution unit 2 finishes cycle 2 of 6 division cycles. Execution unit 3 attempts to read entry 08 of the GPR, but continues to be locked out. See the results in FIG. 17.

With each clock cycle CVT 1 monitors the states of the finish flags to determine if one or more instructions have been completed, but only in the order of the original instructions. If a sequentially successive row has the finish flag set, the Rename 2 register is updated by exchanges of register addresses following the procedure described earlier with reference to FIG. 12. Integrity of sequentiality is maintained by such ordered update of the CVT and Rename 2 register.

Figure 18:
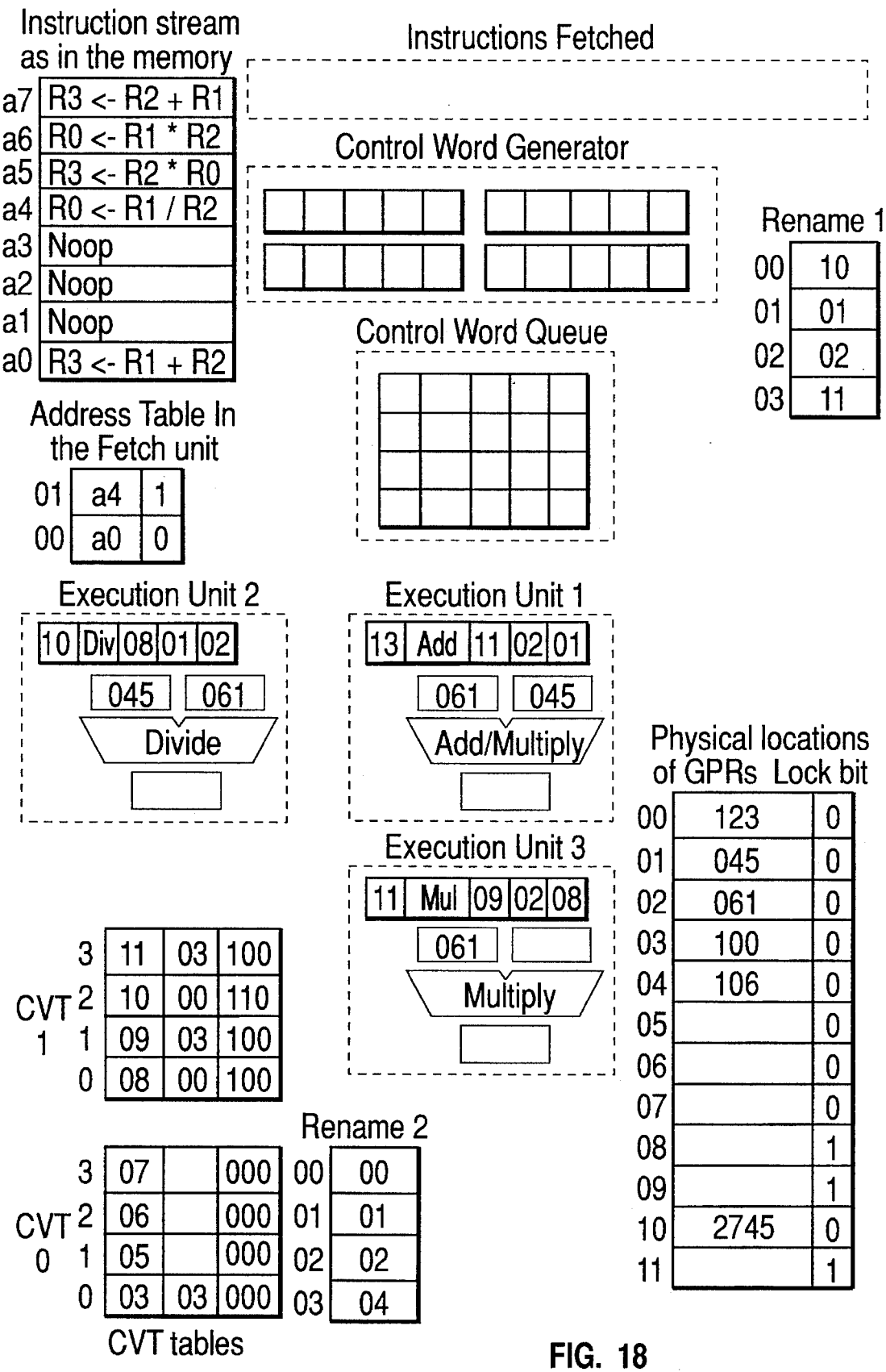
FIG. 18 schematically illustrates the register contents of an example system managing a set of example instructions.

Clock cycle 7 enables a number of events. See FIG. 18. First, the control word queue finds execution unit 1 is available and capable of an add operation. Execution unit 1 receives the control word and reads the source register data from the GPR. Execution unit 2 finishes cycle 3 of 6 in the division operation. Execution unit 3 again attempts to read register 08 in the GPR. And lastly, CVT 1 tries to update Rename 2, but is precluded because there are unfinished entries before the row 2 entry.

Figure 19:
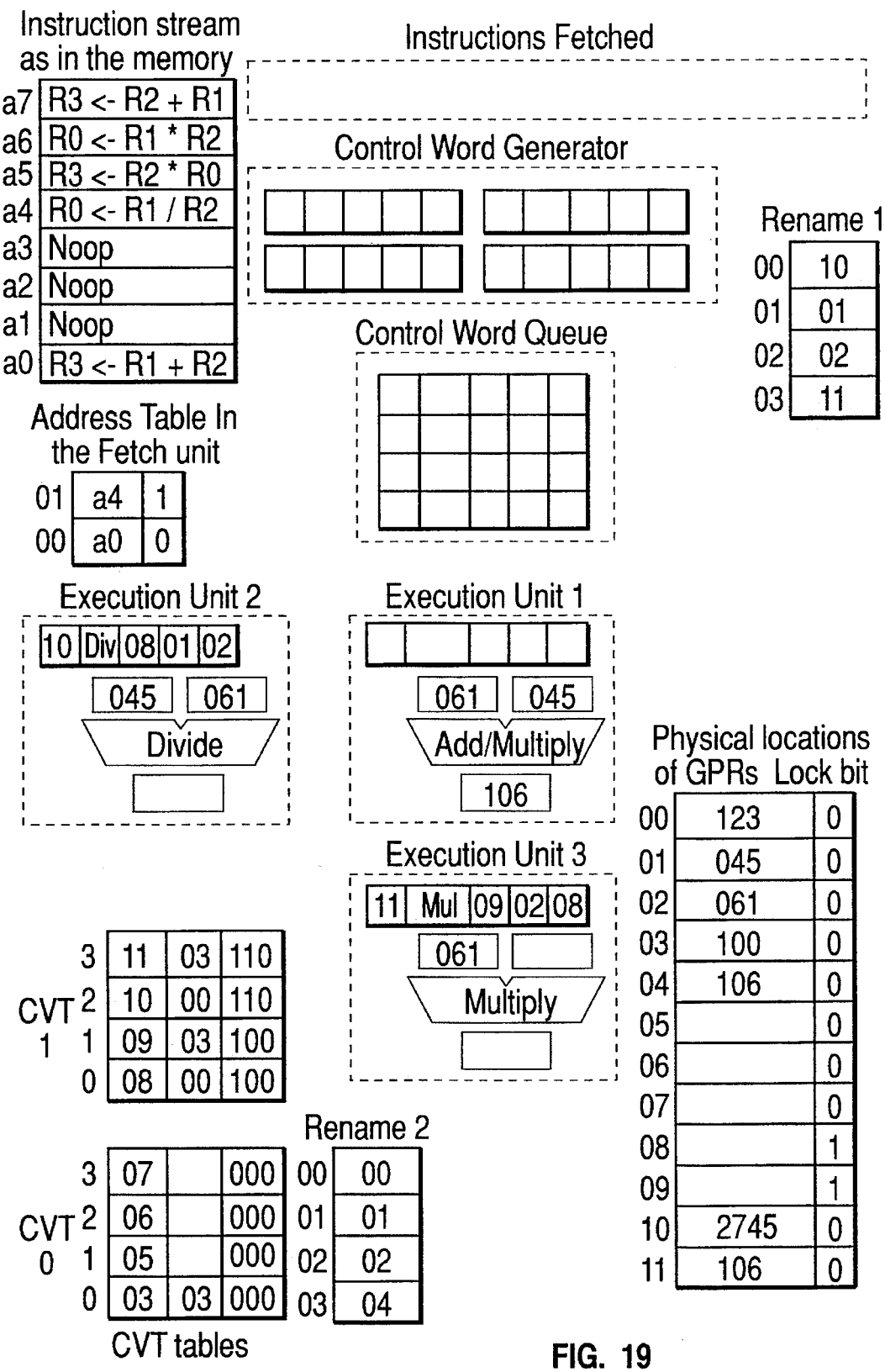
FIG. 19 schematically illustrates the register contents of an example system managing a set of example instructions.

FIG. 19 illustrates the states of the registers following clock cycle 8. During this cycle execution unit 1 finishes the add operation, because it is a one cycle operation, writes the result into GPR address 11, turns off the GPR address 11 lock bit, and sets the finish bit of the CVT 1 row entry 3. Execution unit 2 finishes cycle 4 of 6 of the division operation. Execution unit 3 again attempts to read register 08 in the GPR. CVT 1 again attempts to update Rename 2, but is precluded by the unfinished entries before row entry 2.

Note that in this set of four instructions the last instruction finished first and was allowed to write to a destination. The first instruction and the second instruction completed later. This illustrates that WAR, WAW, and RAW hazards are appropriately managed by the architecture.

During clock cycle 9, execution unit 1 is free in that there are no more instructions entering. Execution unit 2 finishes cycle 5 of 6 in the division operation. Execution unit 3 again attempts to read register 08 in the GPR. CVT 1 again attempts to update Rename 2.

Figure 20:
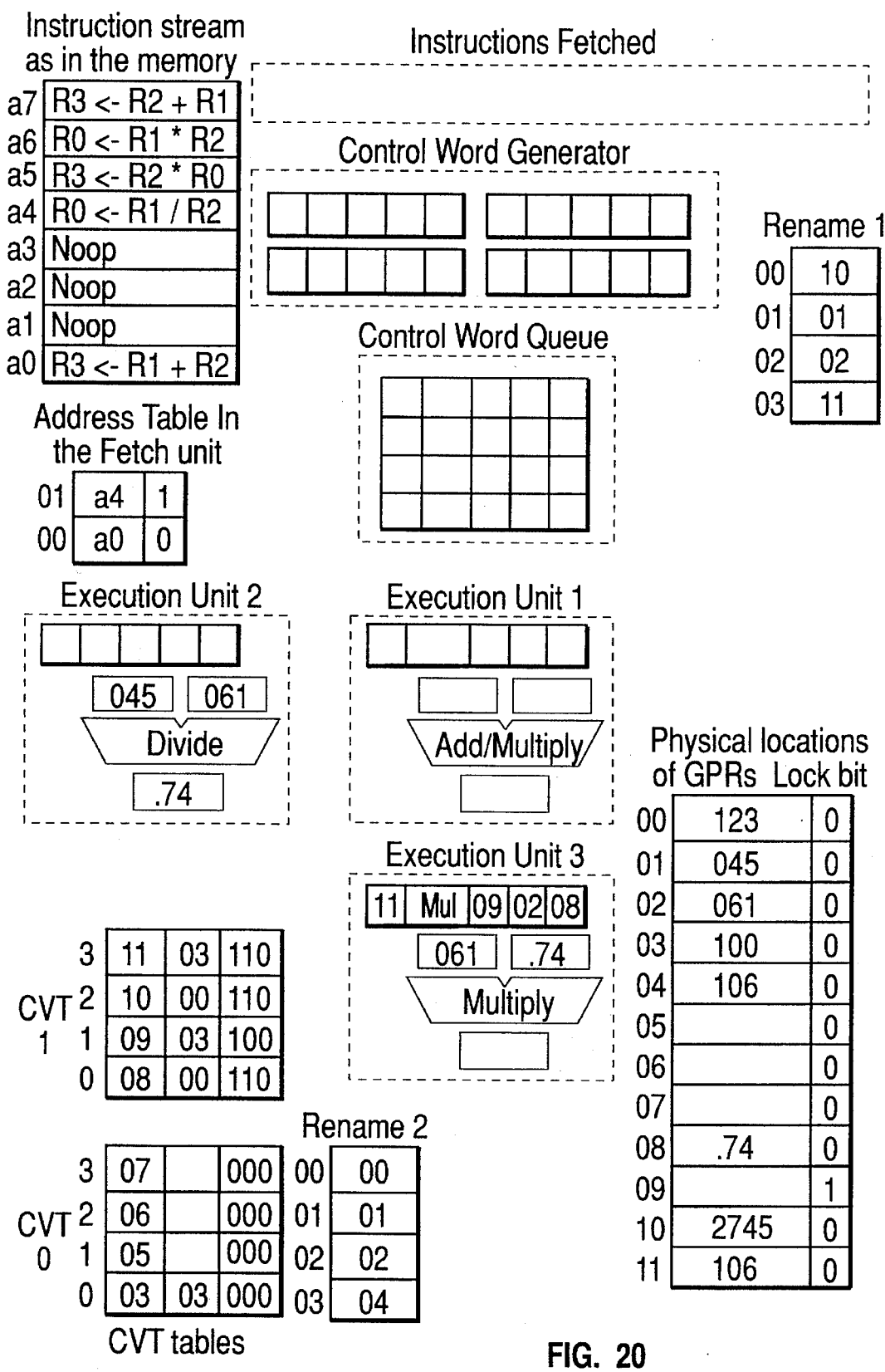
FIG. 20 schematically illustrates the register contents of an example system managing a set of example instructions.

The effects of clock cycle 10 are shown in FIG. 20. Execution unit 1 remains free. Execution unit 2 finishes the divide operation, writes the result data to the GPR register 08, turns off the GPR lock bit, and sets the finish bit on in the CVT 1 row entry 0. Execution unit 3 successfully reads register 08 of the GPR, given that the register is now unlocked. CVT 1 unsuccessfully attempts to update Rename 2.

Figure 21:
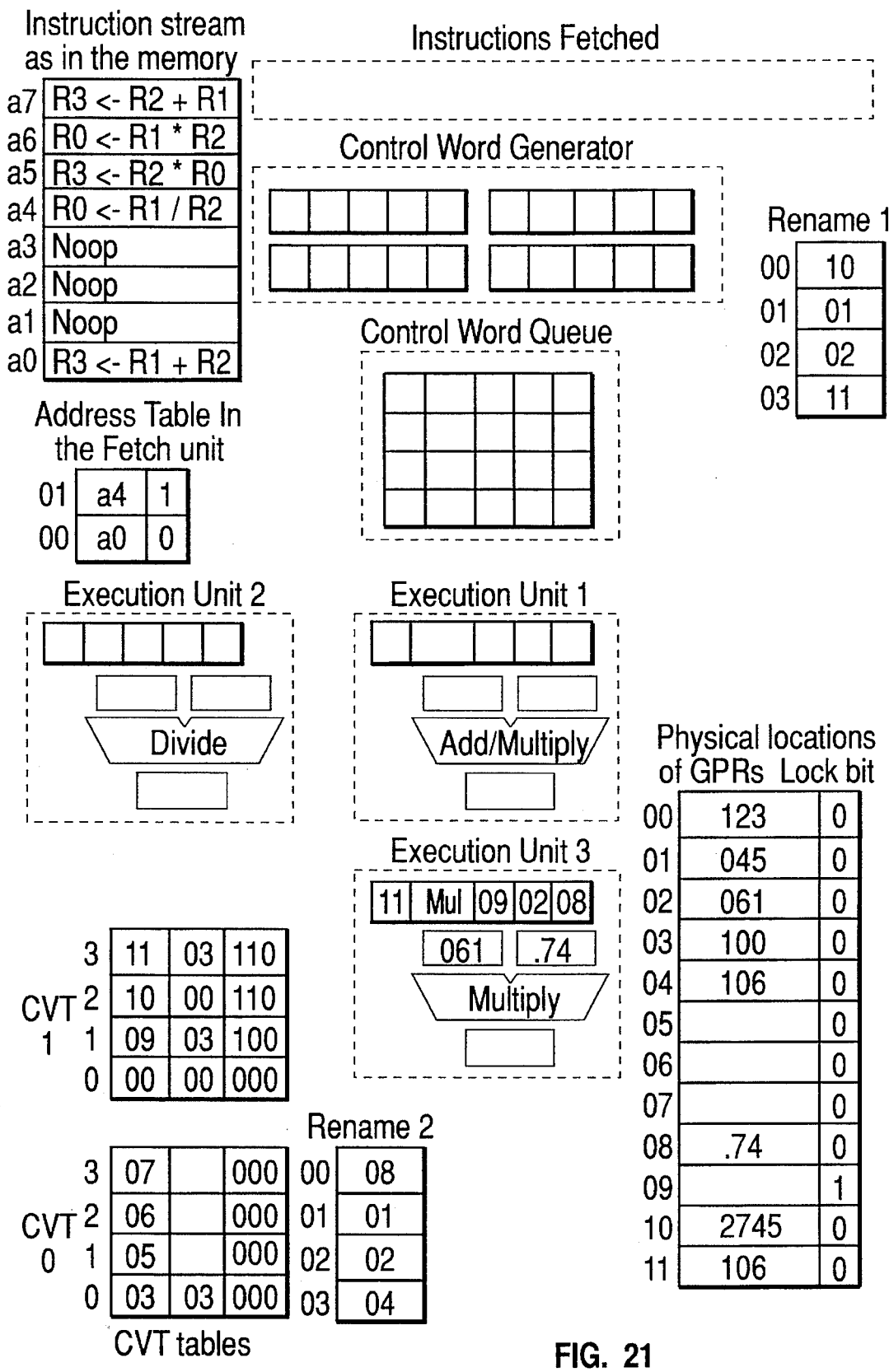
FIG. 21 schematically illustrates the register contents of an example system managing a set of example instructions.

During the eleventh clock cycle execution unit 1 remains free. Execution unit 2 is now also free. Execution unit 3 executes cycle 1 of the two cycle multiply operation. CVT 1 updates its row entry 0 and associated address 00 of Rename 2. CVT 1 row entry 1 is not finished, and because of integrity of sequentiality constraints, precludes the update of entries 2 and 3. See the outcome in FIG. 21.

Figure 22:
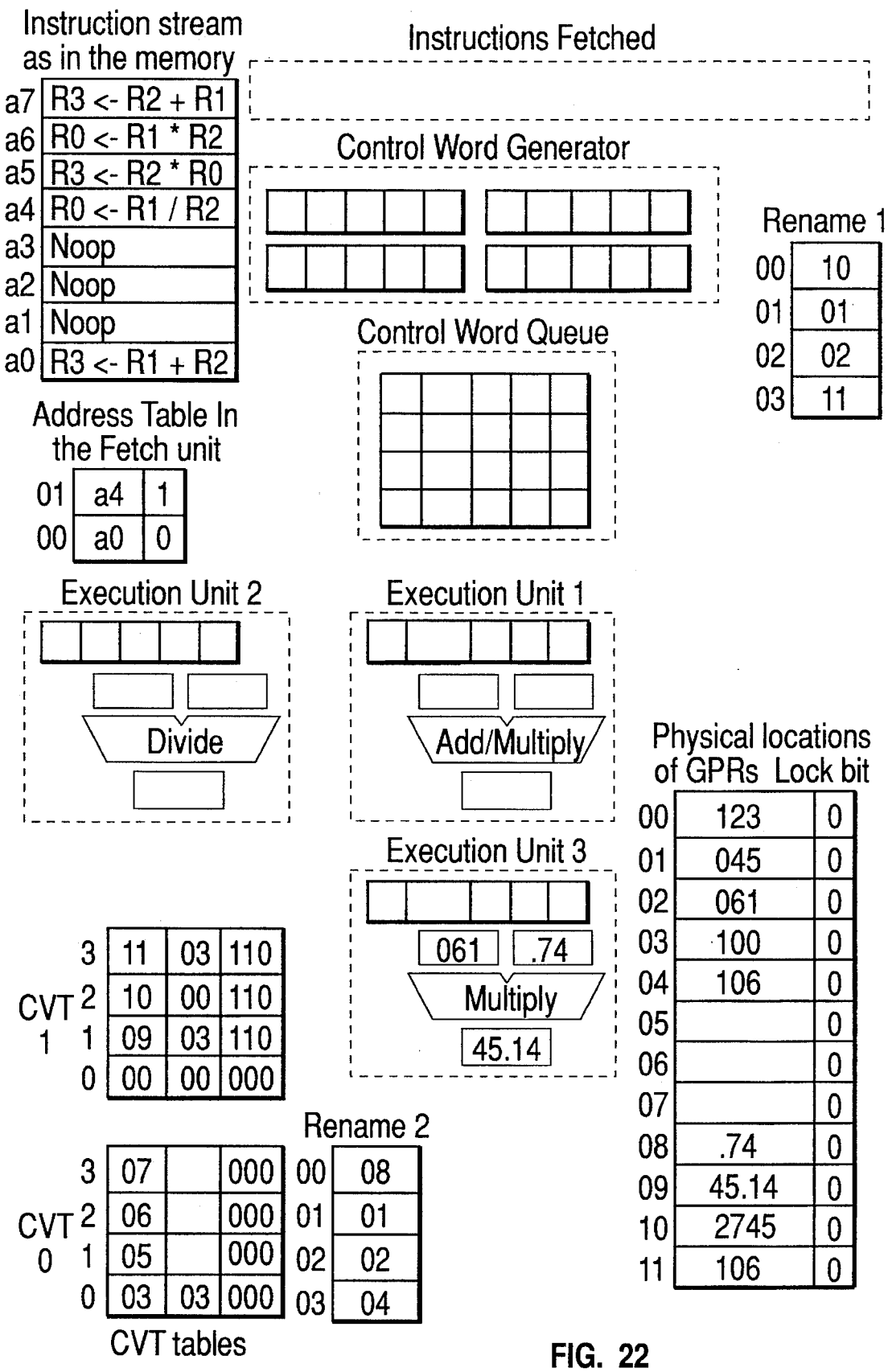
FIG. 22 schematically illustrates the register contents of an example system managing a set of example instructions.

The results of the twelfth clock cycle appear in FIG. 22. Execution unit 1 remains free. Execution unit 2 remains free. Execution unit 3 completes the multiply operation, writes the result into GPR register 09, turns off the register 09 lock bit, and sets the finish flag bit in CVT 1 entry row 1. CVT 1 is unable to update Rename 2 because the evaluation for sequentiality occurs during the same cycle that the execution units results are written and the finish flag is set.

The thirteenth clock cycle has all execution units free. See FIG. 23. Because all the finish flags in the succession of row entries 1, 2 and 3 in CVT 1 are set with the conclusion of the twelfth cycle, see FIG. 22, Rename 2 is ready to be updated with this cycle.

Figure 23A:
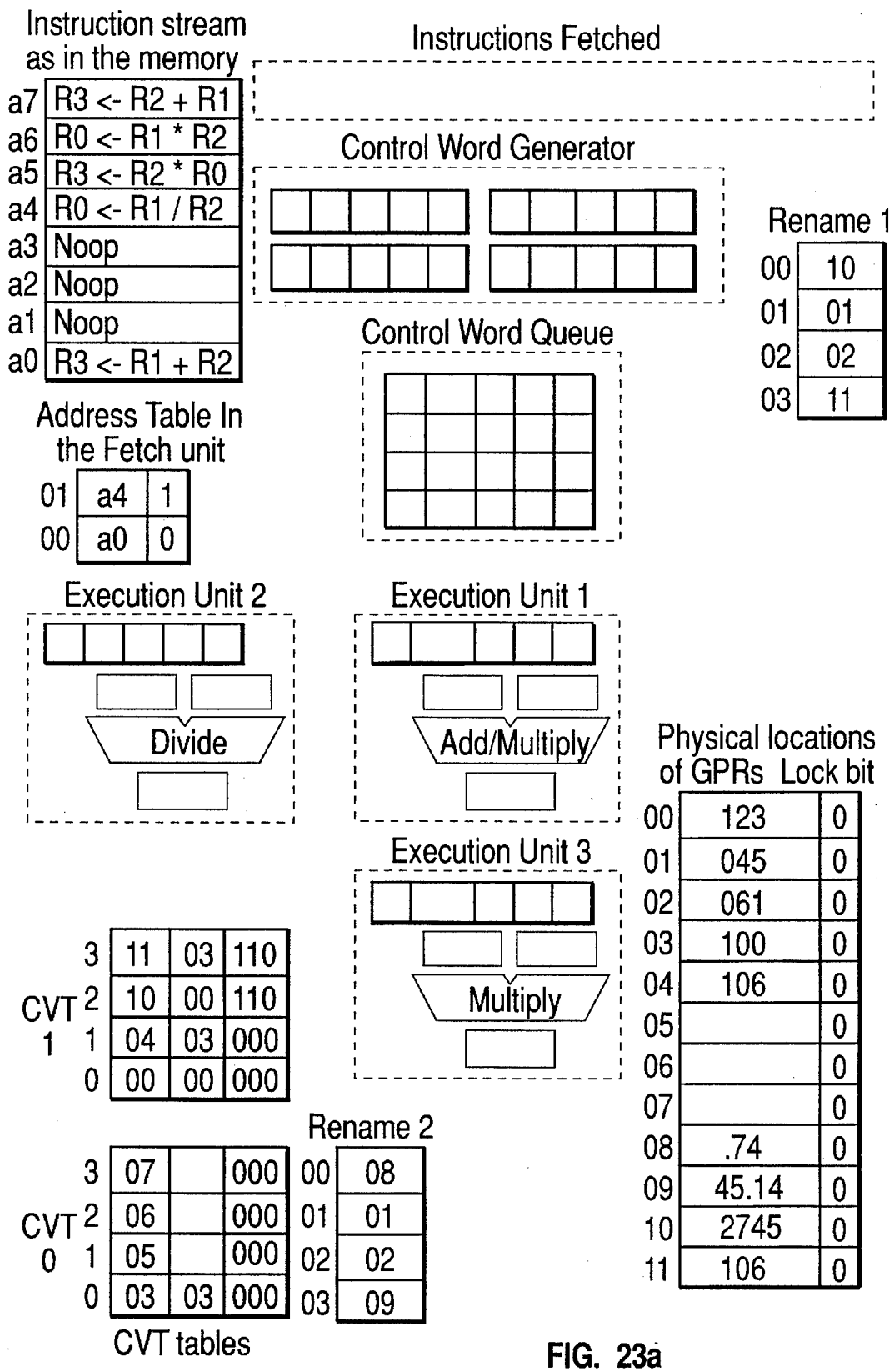
FIGS. 23a, 23b, and 23c schematically illustrate the register contents of an example system managing a set of example instructions.
Figure 23B:
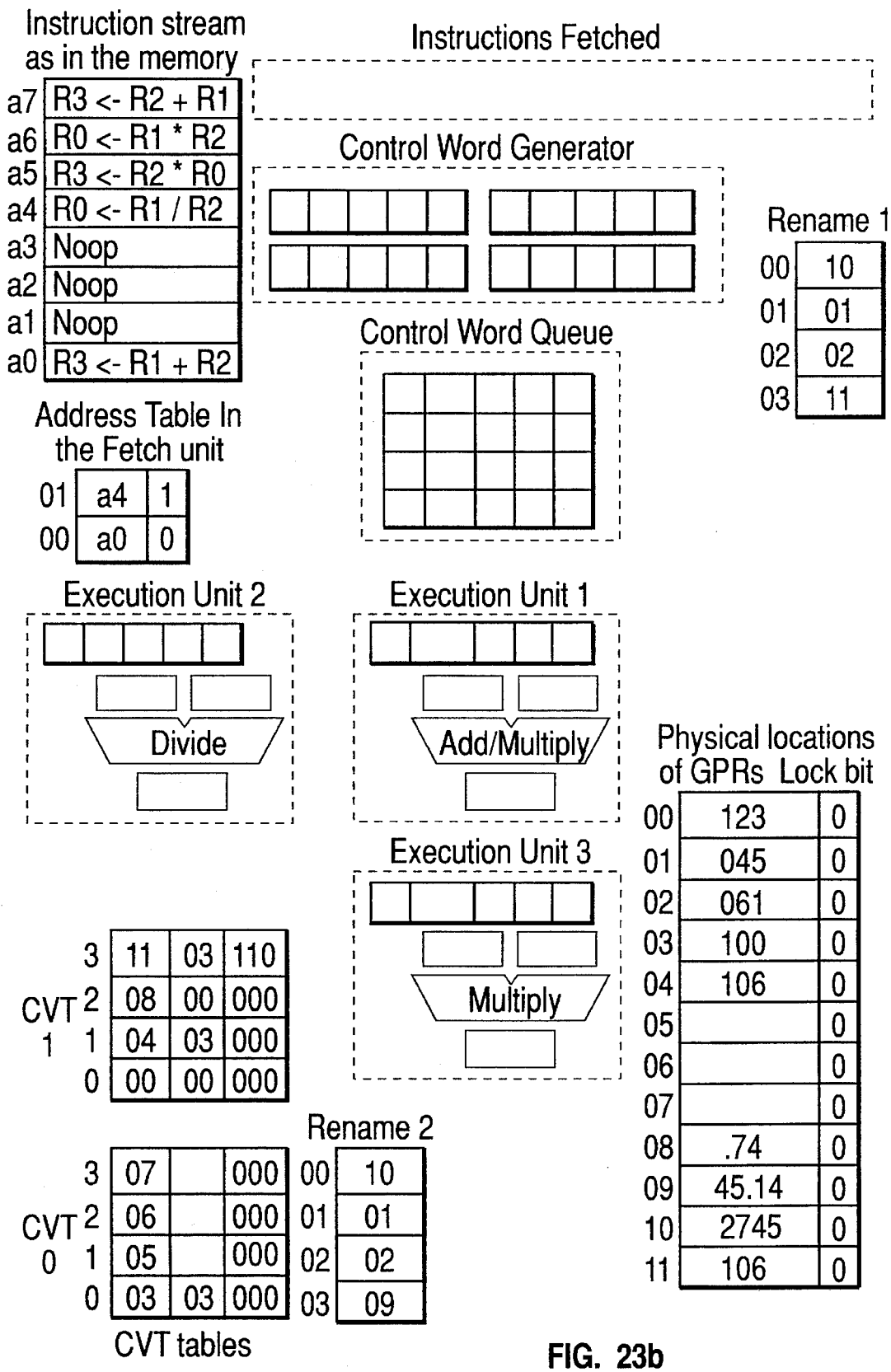
Figure 23C:
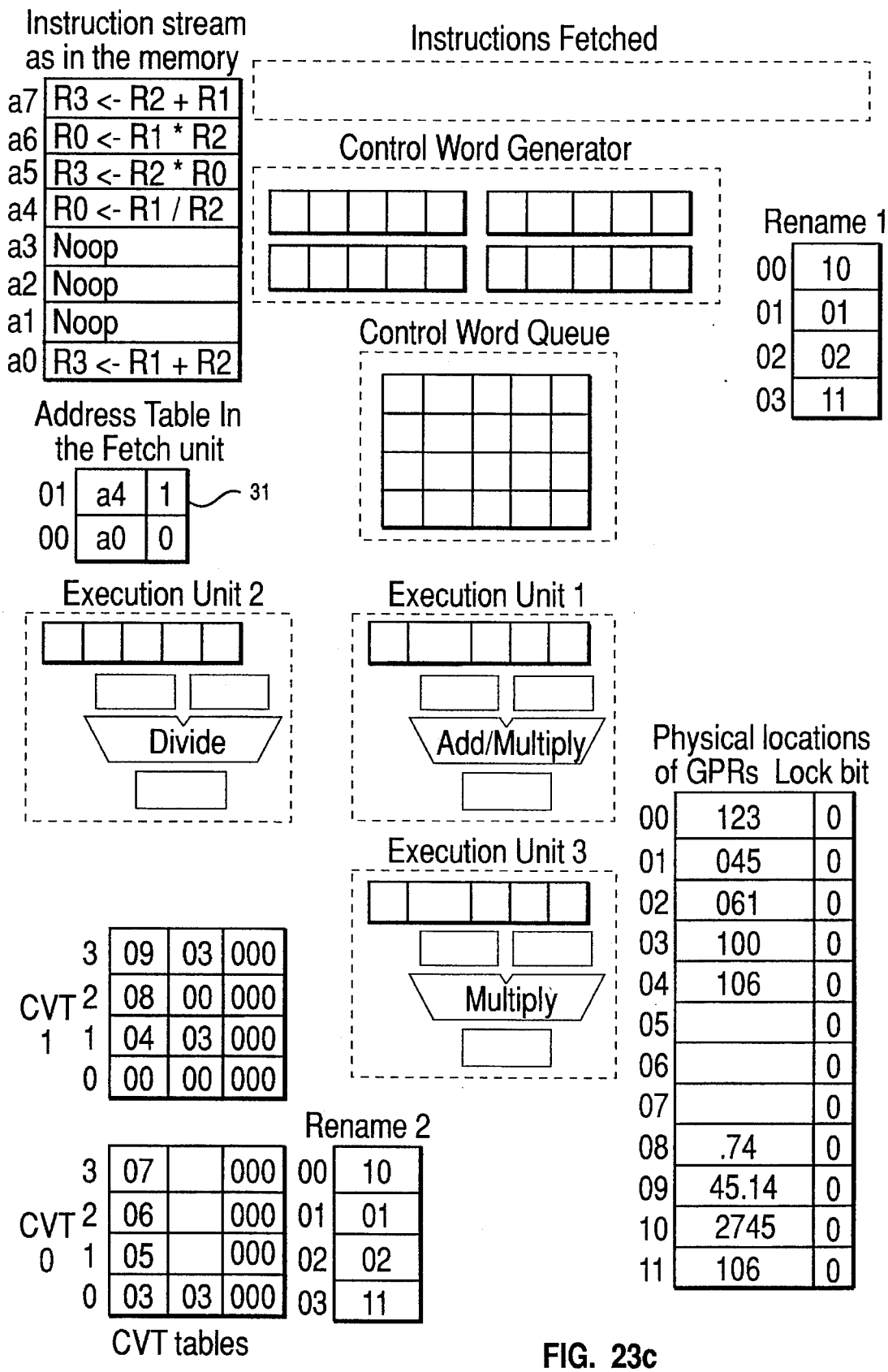

The update operation is individualized in the succession of FIGS. 23a–23c to simplify the understanding. In an actual system the operations would occur simultaneously. The addresses in the logical entries of CVT 1 (center column) are again used to identify the Rename 2 rows, whereupon the GPR addresses are exchanged between the CVT 1 table and Rename 2 register. Notice that if two logical addresses in the CVT identify the same Rename 2 row entry, such as the two 03 pointers in CVT 1, sequentiality of the update order from CVT 11 toward CVT 13, permits a single update using the last location. Thereby only a single exchange of 04 and 11 need be performed for the 03 logical address.

The address table in the instruction fetch unit, reference numeral 31, also gets updated to reflect the state of CVT 1. The bit is turned off to signal that both this address in the table and CVT 1 are ready for reuse.

Note the results in the GPR registers as translated by the Rename 2 correspond to the values in Table A below. Rename 2 entry 00 points to GPR 10, which contains the value 2745. Rename 2 entry 01 points to GPR 01, which contains the value 45. Rename 2 entry 02 points to GPR 02, which contains the value 61. And lastly, Rename 2 entry 03 points to GPR 11, which contains the value 106. All the results are as expected.

To appreciate the ability of the architecture to manage precise interrupts, consider a refinement of the preceding example. By precise interrupts, it is meant that the super scalar system can withstand an interrupt or branch operation while maintaining the integrity of the instruction sequence as originally defined by the programmer.

TABLE A (Repeated)

| | Initial State | Divide First Instruction | Multiply Second Instruction | Multiply Third Instruction | Add Fourth Instruction |
|---|---|---|---|---|---|
| R0 | 123 | .74 | .74 | 2745 | 2745 |
| R1 | 45 | 45 | 45 | 45 | 45 |
| R2 | 61 | 61 | 61 | 61 | 61 |
| R3 | 106 | 106 | 45.14 | 45.14 | 106 |

Figure 24:
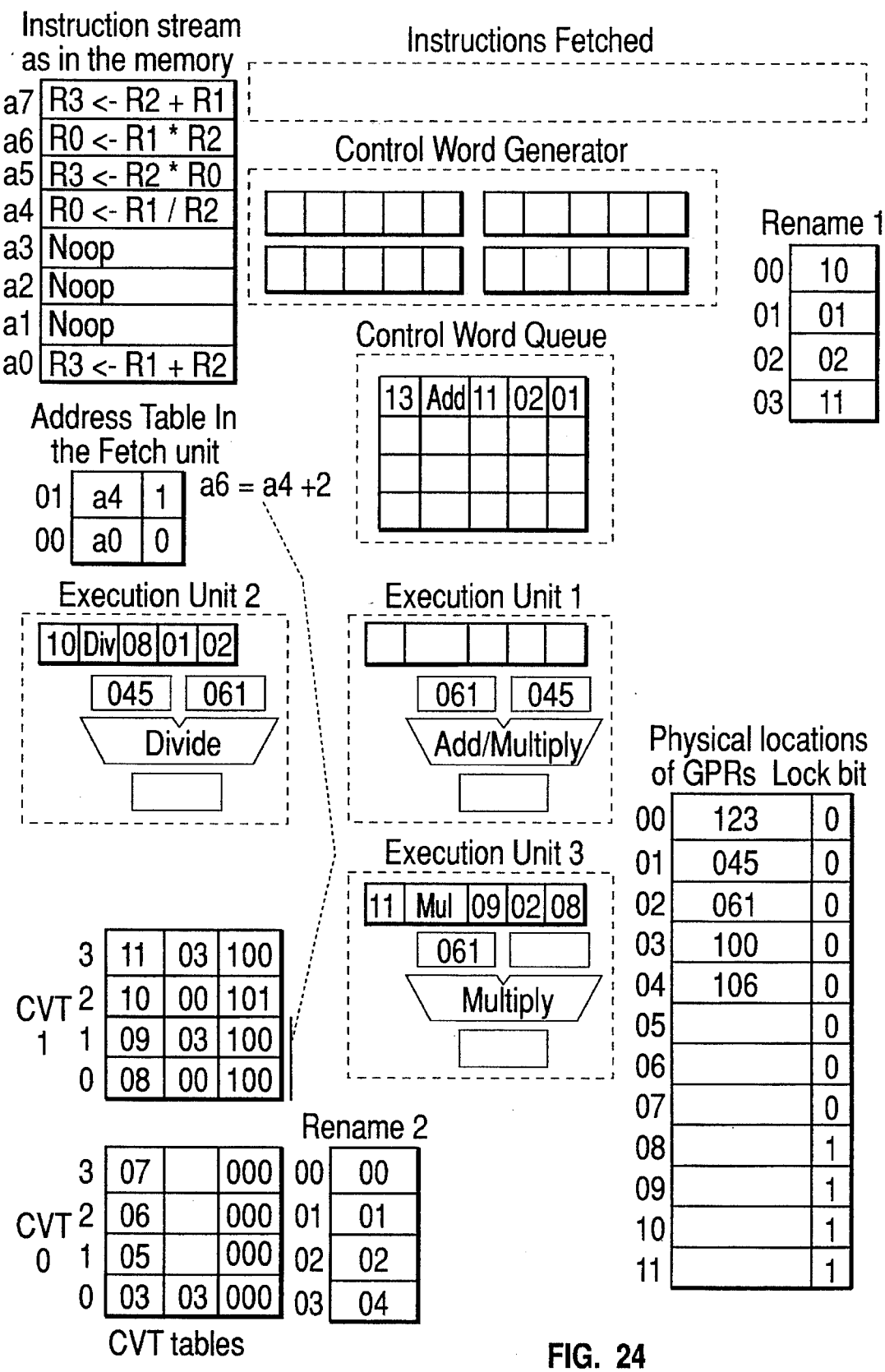
FIG. 24 schematically illustrates the register contents of an example system managing a set of example instructions.

Assume that the third instruction, namely a6, which is a multiply instruction involving R1 and R2 being performed in Execution Unit 1 encounters an interrupt after executing the first of 3 clock cycles. When the above situation occurs the computer has already finished with the first (a4) and second (a5) instructions. The states of the registers and execution units is depicted in FIG. 24. Note that FIG. 24 differs from the corresponding FIG. 17 by the presence of an interrupt flag and the absence of a finish flag in CVT 1 row entry 2.

The fourth instruction must not execute, or its result must not be written to the GPR. The various super scalar architectures have taken different approaches to solving this problem. Some have taken extra precautions in advance, so instructions suspected of causing interrupts are shelved or held in the pipe. Some architectures use duplicate register files identified as shadow registers, GPR pre buffers, or the like. Decisions are made after execution whether to move the results to the real GPR locations. Unfortunately, such techniques slow the execution rates of succeeding instructions.

In contrast, the present architecture permits the instructions to flow within the execution units and through most of the control word execution. The effects of the interrupt are resolved at the concluding stages of processing each block of fetched instructions.

As an aside, but an important consideration, the present architecture also ensures that the address of the instruction causing the interrupt (a6 in the example) is identifiable for reporting. In this regard note the CVT 1 interrupt flag is in the third entry of the fetched group beginning with memory address a4. Thus a6=a4+2, where the value 2 is derived from the preceding CVT1 entries not exhibiting an interrupt flag.

The results of completed instructions as appears in the GPRs should reflect the completion of the first and second instructions, and the lack of completion of the interrupted third and fourth instructions. This appears in Table B.

TABLE B

| | Initial State | Divide First Instruction | Multiply Second Instruction | Interrupted |
|---|---|---|---|---|
| R0 | 123 | .74 | .74 | |
| R1 | 45 | 45 | 45 | |
| R2 | 61 | 61 | 61 | |
| R3 | 106 | 106 | 45.14 | |

Thus as to the specific events referenced to clock cycle 5, execution unit 1 finishes cycle 1 of 2 of the multiplication operation, and execution unit 2 finishes cycle 1 of 6 of the division operation. With the interrupt, execution unit 1 stops executing and sets the interrupt bit in the row entry 2 of CVT 1. Execution unit 3 attempts to read the entry 08 in the GPR but is locked out. FIG. 24 shows this status. Other computer operations continue until clock cycle 13, except that new instructions are not fetched from memory.

With clock cycle 13 all the execution units are free. The CVT 1 now has entries for 1, 2 and 3. Therefore all rows are ready to be updated by exchanges with Rename 2. Again, the logical entry data in CVT 1 points to the row in Rename 2. However, entries from the location of the Interrupt and up are not updated.

As suggested earlier, the instruction causing the interrupt is readily determined from the register data upon the commencement of the thirteenth clock cycle. The address table in the fetch unit is provided the number 12, which number represents that CVT 1 row entry 2 is the location of the interrupt. The fetch unit determines that entry 1 of the address table is a4. Since that is the address of entry 0, the fetch unit adds 2 to this number, which becomes a6.

Figure 25:
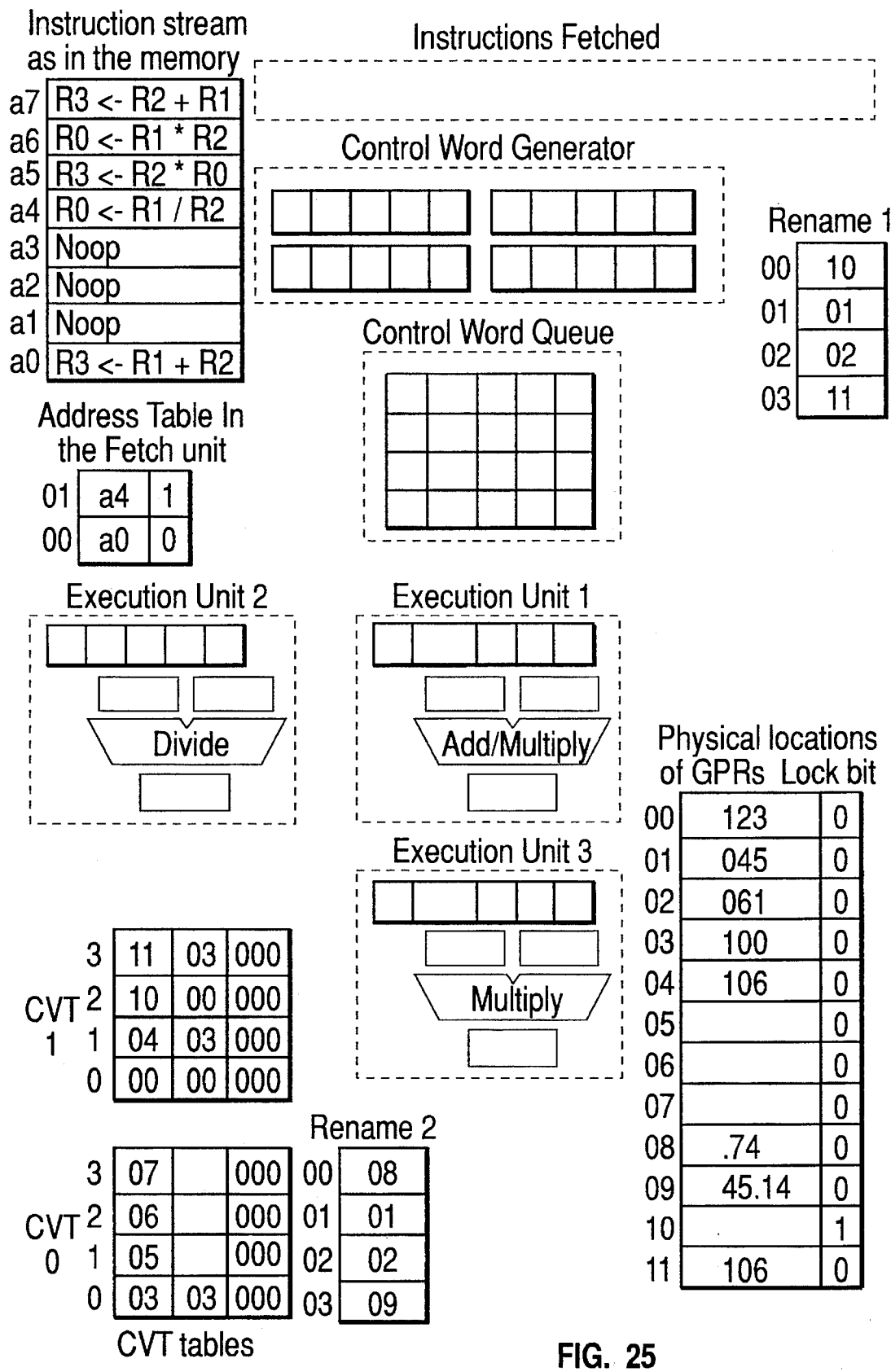
FIG. 25 schematically illustrates the register contents of an example system managing a set of example instructions.

FIG. 25 shows the states of the registers upon the conclusion of the thirteenth cycle involving an interrupt during clock cycle 5 in execution unit 1. The address of the data in the GPR are obtained by translation through the Rename 2 register. For example, Rename 2 entry 00 points to GPR 08, which contains 0.74, the value of R0 following the interrupt. See Table B. Rename 2 entry 01 points to GPR 01, which contains 45, the value of R1 following the interrupt. Rename 2 entry 02 points to GPR 02, which contains 61, the value of R2 following the interrupt. Rename 2 entry 03 points to GPR 09, which contains corresponding value 45.14. The results correctly reflect the states of the instructions processed as of the instruction interrupted even though all the instructions were being processed out of order and in various stages of completion at the actual time of the interrupt. Clearly the instruction could be precisely restarted from the instruction and register states following the interrupt. Instruction processing would begin with the instruction in memory address a6.

Figure 26:
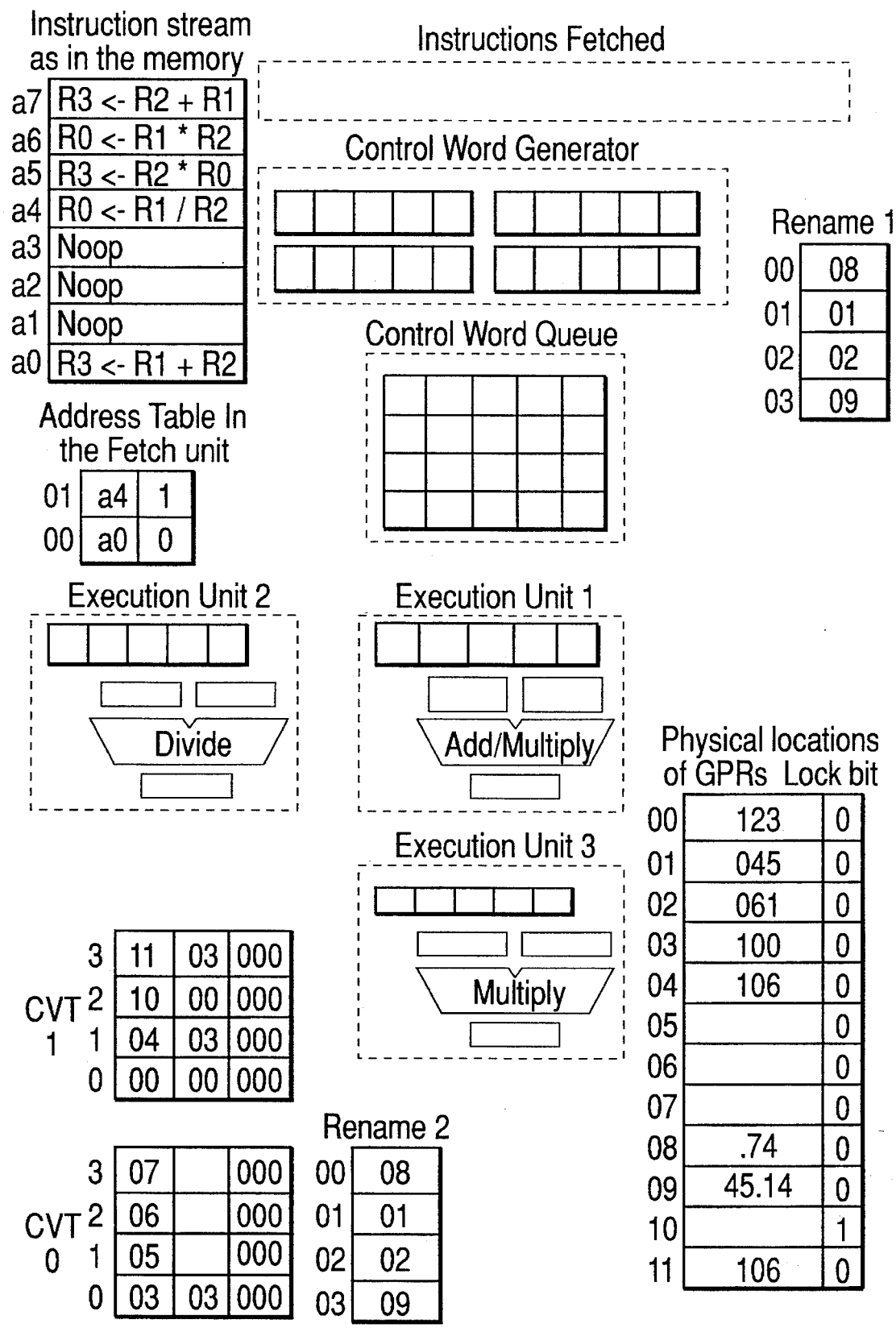
FIG. 26 schematically illustrates the register contents of an example system managing a set of example instructions.

The processing of instructions following an interrupt proceeds in the normal manner with instruction a6 after the contents of the two rename registers have been coordinated. This is analogous to their states when first starting a stream of instructions or upon concluding a stream without an interrupt. As shown in FIG. 26, the contents of Rename 2 are copied to Rename 1 before the fetch that brings in instruction a6 and successors. In effect, the system is restarting with the registers in a state reflecting values calculated prior to the processing of instruction a6. This is illustrated in FIG. 26.

The present super scalar architecture also lends itself to the processing of branch instructions, namely, instructions which conditionally define two different sequence of instructions depending on the outcome of the branch instruction. For example, the instructions could continue along the original instruction steam or shift to a new starting place in a new stream of instructions.

Branch prediction, a technology distinct from the present invention, has proven to be very valuable in anticipating the outcome of branches to minimize the flushing of calculations from execution units and pipelines, such as Control Word Queue 13 in FIG. 6. Branch processing is not only feasible within the framework of the present architecture, but, by virtue of multiple processors, lends itself to a practice in which both branches can be followed until the point of actual resolution.

The present super scalar architecture is amenable to two embodiments of branch management. The first involves the speculative issuance of instructions, based upon a branch prediction, and the ensuing execution of speculative instructions along the predicted branch until the branch instruction is finally resolved. The invention also lends itself to branch processing in a manner whereby instructions representing both forks are issued and executed in parallel until such time that the branch instruction is finally resolved. In both cases, data related to the incorrect branch is readily invalidated upon the resolution of the branch instruction.

A branch processor predicts and issues a stream of speculative instructions based upon a prediction of the outcome of a branch instruction subject to fetching and execution. The architecture refinements focus on identification of control word addresses derived from the speculative instructions to ensure appropriate corrective action if upon final resolution the branch proves to be incorrectly predicted.

Figure 27:
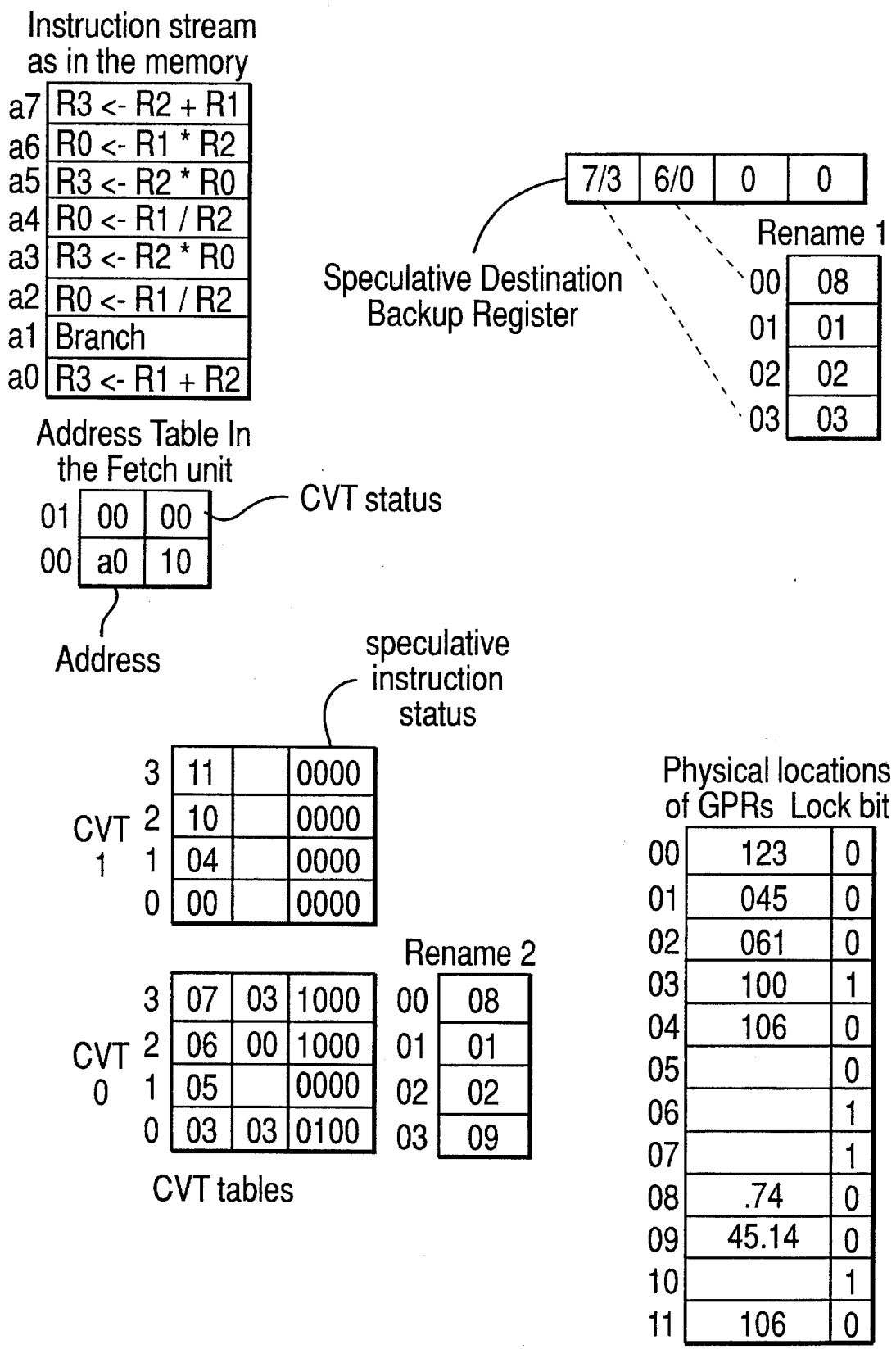

The management of branch instructions requires the use of additional bits in various of the registers described and illustrated hereinbefore. The extensions are shown in the registers of FIG. 27. Note that the Address Table In the Fetch unit has been extended by 1 bit to reflect the presence of a speculative instruction in the corresponding CVT table. Next, the status bits or flags in the right column of each CVT table have been extended by one place to identify and manage speculative instructions. Lastly, a backup register for speculatively renamed destination addresses is associated with the Rename 1 register.

As embodied in the example of FIG. 27, the CVT Status bits in the Address Table of the Fetch unit represent the following conditions:

00 - - - the CVT table is empty.

01 - - - the CVT table is in-use. Upon completion of instructions update only regular, not speculative, instructions of the CVT table.

10 - - - the CVT table includes speculative instructions. Do not update any of the CVT table because the branch has not been resolved.

11 - - - the CVT table has speculative instructions, but are from the taken branch and should therefore be updated in normal manner.

In addition to the overall CVT table status indicators described above, the CVT tables themselves include speculative instruction status bits. The purpose of these bits is to classify instructions. For instance, the following bit combinations respectfully represent:

00 - - - there is no instruction in this line entry of the CVT.

01 - - - this is a regular instruction line entry, either because it is a normal, nonspeculative, instruction or was a speculative branch instruction which has since been resolved as falling within the taken branch.

10 - - - the instruction in this line entry is speculative.

The remaining two of the 4 bits in each CVT table continue to serve as flags indicating that an instruction has been fully executed and indicating the occurrence of an interrupt in association with an instruction.

In addition to the Address table and CVT table expansions, the issuance of speculative instructions in the context of a branch require that the states in the Rename 1 register for speculative instructions be capable of reconstruction following branch resolution. The speculative destination backup register depicted in FIG. 27 stores a speculative translation, while a branch is unresolved, and transfers the translation information to Rename 1 register upon the resolution of the branch. This refinement permits the present super scalar progressor to use the Rename 1 register functions but mark each such speculative instruction for corrective action in the event the branch outcome is inconsistent with the prediction.

FIGS. 27, 28 and 29 depict by sequence an example of the invention in the context of managing a branch instruction. As appears in FIG. 27, a set of instructions a0–a3 are fetched from memory, including branch instruction a1. The speculative instruction status flags in the CVT tables identify instructions before the branch by bits 01XX, the branch instruction itself by bits 00XX, and the speculative instructions following the branch by bits 10XX. Note that the CVT status bits indicate the presence of a speculative instruction in a CVT table by the 10 bit combination in the Address Table.

The execution of instructions issuing from the control word queue (FIG. 26) continues in normal manner up to and including the operation which indicates by flag bit in the CVT table that an instruction has been fully executed. However, the Rename 2 table is not updated when the CVT table status bits are 10, indicating speculative instructions. After the branch is resolved, and the actions differ depending on the outcome of the branch determination. If the outcome indicates that the speculative branch was correct, the instructions and associated data are considered good for purposes of updating the various registers subject to renaming. In this case, the CVT status is changed from 10 to 11 and all entries in that CVT table are updated with reference to the Rename 2 table in the manner previously described. The information in the speculative destination backup register is transferred to Rename 1. See the concluding status in FIG. 28.

In contrast, if the outcome of the branch instruction indicates that the speculative instructions were not the appropriate ones to be executed, the contents of the speculative destination backup register (FIG. 27) are discarded. Furthermore, the CVT status bits in the Address Table (FIG. 27) are changed from 10 to 01. The Rename 2 register is updated only through those instructions designated as a nonspeculative by bits 01XX. The outcome, following a reset of all tab bits, appears in FIG. 29.

It should be apparent from the description relating to the uses of speculative branching, that the tagging of tables and individual instruction registers therein as being speculative or nonspeculative also lends itself to an architecture in which multiple branches are concurrently followed. Instructions for multiple potential branches are assigned to the multiple execution units and simultaneously processed in anticipation of a branch resolution at a later stage of processing. The benefit of this practice lies in the fact that additional tables and processors can substantially eliminate processor stalling or purging of pipelines as a consequence of incorrect branch predictions. In keeping with the practice of the present invention, instructions processed along the incorrect branches are merely invalidated before updating to the Rename 2 register.

Note that the instruction data dependencies are managed through the use of the lock bit in the general purpose register. The anti-dependencies are managed within the architecture through the renaming of all registers, the source registers using the Rename 1 table and the destination registers using the CVT tables. Finally, the integrity of sequentiality, such as may be required with precise interrupts, restarts or branches with instruction deletions, is accomplished through the ordered retirement aspect of the architecture. Out-of-order execution of instructions resulting from differences between execution units or instruction cycle rates is of no consequence in the context of this architecture. The hardware device count and complexity is also minimized in that the control words are not supplemented with extended status, count or location data bit strings, beyond a mere CVT address. The efficient recycling of general purpose registers is clearly evident.

Though the invention has been described and illustrated by way of a specific embodiment, the systems and methods encompassed by the invention should be interpreted consistent with the breadth of the claims set forth hereinafter.

I claim:

1. A super scalar computer architecture for executing instructions out-of-order with at least several instructions performing computations on data in computer architected registers, comprising:

a source of instructions which are arranged in an order that the instructions are to be executed;

a multiplicity of execution units for executing control words;

a plurality of general purpose registers for storing control word data by address;

means for forming control words, for transmission to available execution units, by replacing any specified computer architected register with a renamed and recycled register address referenced to a general purpose register;

collision vector table means for storing control word execution status and for providing register addresses to the means for forming control words in a sequence matching the order that the instructions are to be executed, the collision vector table means has a table size defined by the difference between the number of general purpose registers and the number of computer architected registers; and means for using the collision vector table means to recycle general purpose register addresses responsive to the execution of control words in the execution units to thereby allow for out-of-order control word execution.

2. The architecture recited in claim 1, wherein the means for recycling general purpose register addresses updates the collision vector table means upon execution of control words in the order the instructions are to be executed.

3. The architecture recited in claim 2, wherein the means for forming control words generates control words comprising an opcode, renamed source addresses, and collision vector table means recycled destination addresses.

4. The architecture recited in claim 1, wherein the collision vector table means comprises sub-tables which coincide in size to the number of instructions fetched during a cycle.

5. The architecture recited in claim 4, wherein the means for forming control words generates control words composing an opcode, renamed source addresses, and collision vector table means recycled destination addresses.

6. The architecture recited in claim 1, wherein the means for recycling general purpose register addresses distinguishes by tag control words derived from speculative instructions.

7. The architecture recited in claim 1, wherein the means for recycling general purpose register addresses distinguishes by tag control words derived from instructions corresponding to different paths after a branch instruction.

8. A method of operating a super scalar architecture computer to allow out-of-order execution of input instructions with at least several instructions performing computations on data in computer architected registers, comprising the steps of:

providing instructions in an order that the instructions are to be executed; forming control words for transmission to available execution units of a multiplicity of computer execution units which execute control words by:

renaming source register addresses of multiple input instructions using a first rename table to replace specified computer architected registers with renamed and recycled register addresses referenced to general purpose registers, from a plurality of general purpose registers for storing control word data by address; and renaming destination register addresses of multiple input instructions using recycled addresses from a collision vector table storing control word status in a sequence matching the order that the instructions are to be executed, the table size defined by the difference between the number of general purpose registers and the number of computer architected registers;

processing control words composed of renamed source register addresses and renamed destination register addresses using available execution units; and recycling general purpose register addresses using the collision vector table responsive to executing control words to allow out-of-order control word execution.

9. The method recited in claim 6 further including the step of:

locking access to data in destination registers until register related data is generated by the corresponding execution unit.

10. The method recited in claim 9, further comprising the step of:

upon entry of register related data, unlocking access to the corresponding destination register and setting a finish flag in a corresponding entry off the collision vector table.

11. The method recited in claim 10, further comprising the step of:

recycling general purpose register addresses between the collision vector table and a second rename table in sequence with the completion of instructions in the order of their input.

12. The method recited in claim 8, further comprising the steps of:

distinguishing, by tags related to control word addresses, the control word addresses attributed to speculative instructions; and selectively delaying the recycling of general purpose register addresses distinguished by tags until a branch associated with speculative instructions is resolved.

13. A data processing system for executing an ordered list of instructions with at least several instructions performing computations on data in architected registers, said system comprising:

a plurality of general purpose registers storing data;

a plurality of rename registers corresponding to the architected registers and containing addresses of general purpose registers;

control word means for providing a control word in place of each instruction, each control word having any specified architected register replaced by a general purpose register address contained in its corresponding rename register;

a plurality of execution units for executing control words on data from said general purpose registers; and regulation means for regulating execution of control words in each execution unit maintaining ordered instruction data integrity in said general purpose registers through an assignment of general while providing out of order control word execution, said regulation means including means for storing control word execution status in a table of a size defined by the difference between the number of general purpose registers and the number of computer architected registers.

14. The system recited in claim 13, further comprising:

means for identifying by tags related to control words one or more control words attributed to speculative instructions of a branch; and means for using the tags to selectively delay operations of the regulation means until the branch is resolved.

15. The system recited in claim 13, further comprising:

means for identifying by tags related to control words one or more control words attributed to different branches; and means for using the tags to select control words subject to the regulation means following branch resolution.

16. A data processing system for executing an ordered list of instructions with at least several instructions performing computations on data in architected registers, said system comprising:

a plurality of general purpose registers storing data, each register including means for indicating it is to receive data;

a plurality of rename registers corresponding to the architected registers and containing addresses of general purpose registers;

control word means for providing a control word in place of each instruction, each control word having any specified architected register replaced by a general purpose register address contained in its corresponding rename register;

a plurality of execution units for executing control words on data from said general purpose registers; and regulation means for regulating execution of control words in each execution unit maintaining ordered instruction data integrity in said general purpose registers through an assignment of general purpose registers in an order matching the ordered list of instructions while providing out of order control word execution, said regulation means storing control word execution status in a table having a size defined by the difference between the number of general purpose registers and the number of architected registers.

17. A data processing system according to claim 16 wherein said register indicating means includes means to lock access to the register until the register receives data.

* * * * *

UNITED STATES PATENT AND TRADEMARK OFFICE
CERTIFICATE OF CORRECTION

PATENT NO. : 5,481,683
DATED : Jan. 2, 1996
INVENTOR(S) : Faraydon Karim

It is certified that error appears in the above-identified patent and that said Letters Patent is hereby corrected as shown below:

On title page, item [54] and col. 1, line 2,

In the Title delete "Remand" and insert --renamed--;

Col. 9, line 61, after the word "address", insert --04.--

Signed and Sealed this

Twenty-third Day of April, 1996

Attest:

BRUCE LEHMAN

Attesting Officer

Commissioner of Patents and Trademarks